United States Patent [19]

Kimura

[11] Patent Number: 5,241,364
[45] Date of Patent: Aug. 31, 1993

[54] CONFOCAL SCANNING TYPE OF PHASE CONTRAST MICROSCOPE AND SCANNING MICROSCOPE

[75] Inventor: Toshihito Kimura, Kanagawa, Japan
[73] Assignee: Fuji Photo Film Co., Ltd., Kanagawa, Japan
[21] Appl. No.: 778,372
[22] Filed: Oct. 17, 1991

[30] Foreign Application Priority Data

Oct. 19, 1990 [JP] Japan .................................. 2-282810
Feb. 7, 1991 [JP] Japan .................................. 3-16553

[51] Int. Cl.$^5$ .............................................. G01D 9/00
[52] U.S. Cl. ................................................. 356/351
[58] Field of Search ................. 359/370, 371; 356/351, 356/353

[56] References Cited

U.S. PATENT DOCUMENTS

| 5,065,008 | 11/1991 | Hakamata et al. |
| 5,081,349 | 1/1992 | Iwasaki. |
| 5,081,350 | 1/1992 | Iwasaki et al. |
| 5,084,612 | 1/1992 | Iwasaki et al. |
| 5,086,222 | 2/1992 | Shibuya ............................... 359/370 |

FOREIGN PATENT DOCUMENTS

| 948408 | 8/1949 | France ........................... 359/370 |
| 62-217218 | 9/1987 | Japan. |

*Primary Examiner*—Richard A. Rosenberger
*Attorney, Agent, or Firm*—Sughrue, Mion, Zinn, Macpeak & Seas

[57] ABSTRACT

A confocal scanning type of phase contrast microscope comprises a sample supporting member, which supports a sample, and a light source, which produces a light beam. A light projecting optical device forms a light spot of the light beam on the sample. A light receiving optical device forms a point image of the light beam radiated out of the sample. A photodetector detects the point image. A phase difference optical device has a a stop located on the side of the light projecting optical device and a phase plate which is located on the side of the light receiving optical device. The phase difference optical device imparts a phase lag to only either one of a light component, which has been diffracted by the sample, and an undiffracted light component, which has passed through the sample or has been reflected thereby, and causes the light components to interfere with each other. A movable member supports the light projecting optical device, the light receiving optical device, and the phase difference optical device. The movable member is moved such that the light spot scans the sample in main scanning directions The sample supporting member is moved with respect to the movable member in sub-scanning directions, which are normal to the main scanning directions, and at a speed lower than the main scanning speed.

28 Claims, 13 Drawing Sheets

F I G. 13
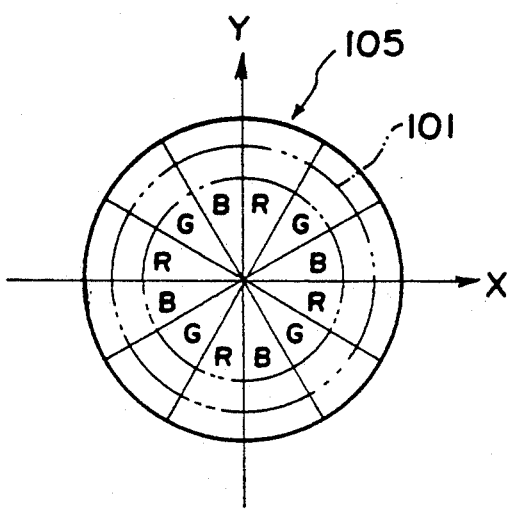
F I G. 14
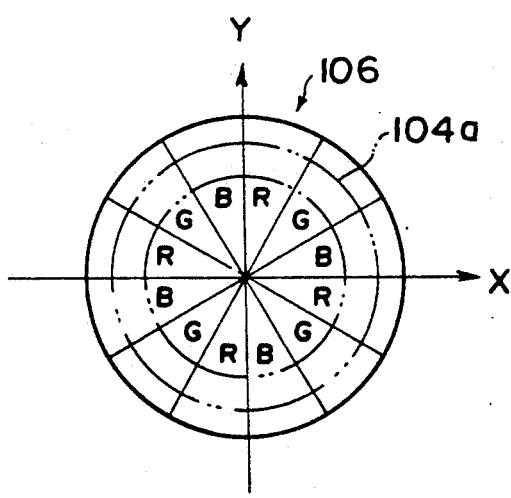

CONFOCAL SCANNING TYPE OF PHASE CONTRAST MICROSCOPE AND SCANNING MICROSCOPE

BACKGROUND OF THE INVENTION

1. Field of the Invention

This invention relates to a confocal scanning type of phase contrast microscope for forming a visible image representing the phase information of a transparent sample. This invention also relates to a scanning microscope, which can form an ordinary bright field image and a visible image representing the phase information of a transparent sample.

2. Description of the Prior Art

Optical type scanning microscopes have heretofore been used. With the scanning microscope, a light beam is converged to a small light spot on a sample, and the sample is two-dimensionally scanned with the light spot. The light beam, which has passed through the sample during the scanning, the light beam, which has been reflected from the sample during the scanning, or the fluorescence, which is produced by the sample during the scanning, is detected by a photodetector. An enlarged image of the sample is thereby obtained.

As one type of the scanning microscopes, a confocal scanning microscope has heretofore been proposed. With the confocal scanning microscope, a light beam is produced by a light source and is condensed to a light spot such that an image of the light spot is formed on a sample. Also, a point image of the light beam, which has been radiated out of the sample, is formed and detected by a photodetector. The confocal scanning microscope is advantageous in that no pinhole plate need be located on the surface of the sample.

Basically, the confocal scanning microscope comprises:

i) a light source which produces a light beam,
ii) a sample supporting member on which a sample is supported,
iii) a light projecting optical means with which an image of the light beam is formed as a small light spot on the sample,
iv) a light receiving optical means with which the light beam radiated out of the sample (i.e. the light beam, which has passed through the sample, the light beam, which has been reflected from the sample, or the fluorescence produced by the sample) is condensed, and an image of the condensed light beam is formed as a point image,
v) a photodetector which defects the point image, and
vi) scanning mechanism for two-dimensionally scanning the sample with the light spot.

An example of the confocal scanning microscope is disclosed in Japanese Unexamined Patent Publication No. 62(1987)-217218.

Also, a phase contrast microscope has heretofore been proposed, with which the phase information of a transparent object (i.e. a phase object) can be investigated. Basically, the phase contrast microscope comprises a phase plate, such as a quarter-wave plate, and a ring stop, which are located with a sample intervening therebetween. A light beam is irradiated to the sample. A phase lag is imparted to only either one of a light component of the light beam, which light component has been diffracted by the sample, and an undiffracted light component of the light beam, which undiffracted light component has passed through the sample or has been reflected by the sample. The diffracted light component and the undiffracted light component are then caused to interfere with each other, and the phase information of the sample is thereby converted into brightness and darkness.

The conventional confocal scanning microscope utilizes one of the following scanning mechanisms:

(1) a mechanism which two-dimensionally moves the sample supporting member, and
(2) a mechanism which two-dimensionally deflects the light beam by a light deflector.

However, the scanning mechanism described in (1) has the problem in that the sample flies out of its correct position when it is scanned quickly. With scanning microscopes, samples of living organisms are often observed. If the quick scanning cannot be carried out during the observation of a sample of a living organism, subtle movements of the sample cannot be found. Also, a need exists widely for the real-time recording of images of various other samples. If the quick scanning cannot be carried out, such a requirement cannot be satisfied.

With the scanning mechanism described in (2), quick scanning can be achieved. However, the scanning mechanism has the drawback in that a light deflector, such as a galvanometer mirror or an acousto-optic light deflector (AOD), which is expensive must be used. Also, with the scanning mechanism described in (2), a light beam is deflected by a light deflector. As a result, the angle of incidence of the deflected light beam upon an objective lens of the light projecting optical means changes momentarily, and aberration is caused to occur. Therefore, the scanning mechanism described in (2) also has the problem in that it is difficult for the objective lens to be designed such that aberration can be eliminated. Particularly, in cases where an AOD is utilized, astigmatism occurs in the light beam radiated out of the AOD. Therefore, in such cases, a special correction lens must be used, and the optical means cannot be kept simple.

Also, various attempts have heretofore been made to constitute a phase contrast microscope as a confocal scanning type. However, the same problems as those described above occur with the conventional confocal scanning type of phase contrast microscope.

SUMMARY OF THE INVENTION

The primary object of the present invention is to provide a confocal scanning type of phase contrast microscope which enables quick scanning, which is simple, and which can be manufactured at a low cost.

Another object of the present invention is to provide a scanning microscope in which time- and laborconsuming operations for changing over an optical means for the formation of an ordinary image and an optical means for the formation of a phase contrast image to each other need not be carried out but with which both an ordinary image and a phase contrast image can be obtained.

The specific object of the present invention is to provide a scanning microscope with which both an ordinary image and a phase contrast image of a sample at strictly the same instant can be obtained.

The present invention provides a confocal scanning type of phase contrast microscope comprising:

i) a sample supporting member on which a sample is supported, ii) a light source which produces a light beam, iii) a light projecting optical means with which an image of said light beam is formed as a small light spot on said sample, iv) a light receiving optical means with which the light beam radiated out of said sample is condensed, and an image of the condensed light beam is formed as a point image, v) a photodetector which detects said point image, vi) a phase difference optical means provided with a phase plate and a stop, one of which is located on the side of said light projecting optical means and the other of which is located on the side of said light receiving optical means, said phase difference optical means imparting a phase lag to only either one of a light component of said light beam, which light component has been diffracted by said sample, and an undiffracted light component of said light beam, which undiffracted light component has passed through said sample or has been reflected by said sample, and thereafter causing said diffracted light component and said undiffracted light component to interfere with each other, vii) a movable member which supports said light projecting optical means, said light receiving optical means, and said phase difference optical means together, viii) a main scanning means which reciprocally moves said movable member such that said light spot scans said sample in main scanning directions, and ix) a sub-scanning means which moves said sample supporting member with respect to said movable member in sub-scanning directions, which are approximately normal to said main scanning directions, and at a speed lower than the speed at which said light spot scans said sample in said main scanning directions, whereby said sample is scanned with said light spot in said sub-scanning directions.

As will be understood from the specification, it should be noted that the term "moving a sample supporting member with respect to a movable member in sub-scanning directions" as used herein means movement of the sample supporting member relative to the movable member in the sub-scanning directions, and embraces both the cases wherein the sample supporting member is moved while the movable member is kept stationary with respect to the sub-scanning directions, and cases wherein the movable member is moved in the sub-scanning directions while the sample supporting member is kept stationary.

The speed, at which the sample is scanned with the light spot in the sub-scanning directions, can be kept comparatively low. Therefore, even when the sample supporting member is moved in the sub-scanning directions in the manner described above, the sample does not fly out of its correct position.

With the confocal scanning type of phase contrast microscope in accordance with the present invention, the light beam is not deflected during the scanning. Therefore, only the light beam on the optical axis of the optical means need be taken into consideration during the designing of the optical means. Accordingly, the optical means can be designed easily.

With the confocal scanning type of phase contrast microscope in accordance with the present invention, the light projecting optical means, the light receiving optical means, and the phase difference optical means are supported together by the movable member, and the main scanning of the light spot is carried out by reciprocally moving the movable member. Therefore, the sample supporting member need not be moved quickly, and the sample is prevented from flying out of its correct position. Also, the quick scanning can be achieved.

Also, as described above, with the confocal scanning type of phase contrast microscope in accordance with the present invention, the light beam is not deflected during the scanning, and therefore the optical means can be designed easily. Additionally, no expensive light deflector, such as a galvanometer mirror or an AOD, need be used, and the configuration of the confocal scanning type of phase contrast microscope can be kept simple. Therefore, the confocal scanning type of phase contrast microscope in accordance with the present invention can be manufactured at a lower cost than the conventional confocal scanning types of phase contrast microscopes.

The present invention also provides a first scanning microscope comprising:

i) a sample supporting member on which a sample is supported, ii) a light source for producing a light beam including a light component, which has been polarized linearly in a first direction, and a light component, which has been polarized linearly in a second direction that intersects perpendicularly to said first direction, iii) a first polarizer which has a predetermined shape, said first polarizer transmitting only said light component, which has been polarized linearly in said first direction, therethrough, iv) a second polarizer for transmitting only said light component, which has been polarized linearly in said second direction, therethrough, v) a light projecting optical means for forming an image of the light beam composed of said light components, which have respectively passed through said first polarizer and said second polarizer, said image being formed as a small light spot on said sample, vi) a scanning means which causes said light spot to scan said sample two-dimensionally, vii) an analyzing phase plate which has a shape corresponding to the shape of said first polarizer, said analyzing phase plate transmitting only said light component, which has been polarized linearly in said first direction, therethrough, said light component having been radiated out of said sample (i.e. having passed through said sample or having been reflected by said sample), a phase lag being thereby imparted to said light component, which has been polarized linearly in said first direction, viii) a polarization beam splitter which is located on the side downstream from said analyzing phase plate, said polarization beam splitter separating said light component, which has been polarized linearly in said first direction, and said light component, which has been polarized linearly in said second direction, from each other, ix) a first light receiving optical means for condensing said light component, which has been polarized linearly in said first direction, said light component having been separated by said polarization beam splitter from said light component, which has been polarized linearly in said second direction, an image of the condensed light component being thereby formed as a point image, x) a second light receiving optical means for condensing said light component, which has been polarized linearly in said second direction, said light component having been separated by said polarization beam splitter from said light component, which has been polarized linearly in said first direction, an image of the condensed light component being thereby formed as a point image, xi) a first photodetector for detecting said point image, which has been formed by said first light receiving optical means, and xii) a second photodetector for detecting said point image, which has been formed by said second light receiving optical means.

By way of example, the analyzing phase plate may be made by adhering an ordinary analyzer and a phase plate, such as a quarter-wave plate, to each other, or by locating them in spaced relation.

The present invention further provides a second scanning microscope comprising:

i) a sample supporting member on which a sample is supported, ii) a light source for producing a light beam including a light component, which has been polarized linearly in a first direction, and a light component, which has been polarized linearly in a second direction that intersects perpendicularly to said first direction, iii) a phase plate which has a predetermined shape, said phase plate imparting a phase lag to part of said light beam, which part passes through said phase plate, iv) a polarizer for transmitting only said light component, which has been polarized linearly in said first direction, therethrough, said light component being included in part of said light beam, which part does not pass through said phase plate, v) a light projecting optical means for forming an image of the light beam composed of said part of said light beam, which part has passed through said phase plate, and said light component, which has been polarized linearly in said first direction, said light component having passed through said polarizer, said image being formed as a small light spot on said sample, vi) a scanning means which causes said light spot to scan said sample two-dimensionally, vii) a first analyzer for transmitting only said light component, which has been polarized linearly in said first direction, therethrough, said light component having been radiated out of said sample, viii) a second analyzer which has a shape corresponding to the shape of said phase plate, said second analyzer transmitting only said light component, which has been polarized linearly in said second direction, therethrough, said light component being included in said part of said light beam, which part has been imparted with said phase lag and has been radiated out of said sample, ix) a polarization beam splitter for separating said light component, which has been polarized linearly in said first direction, said light component having passed through said first analyzer, and said light component, which has been polarized linearly in said second direction, said light component having passed through said second analyzer, from each other, x) a first light receiving optical means for condensing said light component, which has been polarized linearly in said first direction, said light component having been separated by said polarization beam splitter from said light component, which has been polarized linearly in said second direction, an image of the condensed light component being thereby formed as a point image, xi) a second light receiving optical means for condensing said light component, which has been polarized linearly in said second direction, said light component having been separated by said polarization beam splitter from said light component, which has been polarized linearly in said first direction, an image of the condensed light component being thereby formed as a point image, xii) a first photodetector for detecting said point image, which has been formed by said first light receiving optical means, and xiii) a second photodetector for detecting said point image, which has been formed by said second light receiving optical means.

The present invention still further provides a third scanning microscope comprising:

i) a sample supporting member on which a sample is supported, ii) a light source for producing a light beam including a light component, which has a first wavelength, and a light component, which has a second wavelength different from said first wavelength, iii) a first filter which has a predetermined shape, said first filter transmitting only said light component, which has said first wavelength, therethrough, iv) a second filter for transmitting only said light component, which has said second wavelength, therethrough, v) a light projecting optical means for forming an image of the light beam composed of said light components, which have respectively passed through said first filter and said second filter, said image being formed as a small light spot on said sample, vi) a scanning means which causes said light spot to scan said sample two-dimensionally, vii) a wavelength selective phase plate which has a shape corresponding to the shape of said first filter, said wavelength selective phase plate transmitting only said light component, which has said first wavelength, therethrough, said light component having been radiated out of said sample, a phase lag being thereby imparted to said light component, which has said first wavelength, viii) a light splitting means which is located on the side downstream from said wavelength selective phase plate, said light splitting means separating said light component, which has said first wavelength, and said light component, which has said first wavelength, from each other, ix) a first light receiving optical means for condensing said light component, which has said first wavelength, said light component having been separated by said light splitting means from said light component, which has said second wavelength, an image of the condensed light component being thereby formed as a point image, x) a second light receiving optical means for condensing said light component, which has said second wavelength, said light component having been separated by said light splitting means from said light component, which has said first wavelength, an image of the condensed light component being thereby formed as a point image, xi) a first photodetector for detecting said point image, which has been formed by said first light receiving optical means, and xii) a second photodetector for detecting said point image, which has been formed by said second light receiving optical means.

By way of example, the wavelength selective phase plate may be made by adhering an ordinary optical filter and a phase plate, such as a quarter-wave plate, to each other, or by locating them in spaced relation.

The present invention also provides a fourth scanning microscope comprising:

i) a sample supporting member on which a sample is supported, ii) a light source for producing a light beam including a light component, which has a first wavelength, and a light component, which has a second wavelength different from said first wavelength, iii) a phase plate which has a predetermined shape, said phase plate imparting a phase lag to part of said light beam, which part passes through said phase plate, iv) a light projecting side filter for transmitting only said light component, which has said first wavelength, therethrough, said light component being included in part of said light beam, which part does not pass through said phase plate, v) a light projecting optical means for forming an image of the light beam composed of said part of said light beam, which part has passed through said phase plate, and said light component, which has said first wavelength, said light component having passed through said light projecting side filter, said image being formed as a small light spot on said sample, vi) a scanning means which causes said light spot to scan said sample two-dimensionally, vii) a first light receiving side filter for transmitting only said light component, which has said first wavelength, therethrough, said light component having been radiated out of said sample, viii) a second light receiving side filter which has a shape corresponding to the shape of said phase plate, said second light receiving side filter transmitting only said light component, which has said second wavelength, therethrough, said light component being included in said part of said light beam, which part has been imparted with said phase lag and has been radiated out of said sample, ix) a light splitting means for separating said light component, which has said first wavelength, said light component having passed through said first light receiving side filter, and said light component, which has said second wavelength, said light component having passed through said second light receiving side filter, from each other, x) a first light receiving optical means for condensing said light component, which has said first wavelength, said light component having been separated by said light splitting means from said light component, which has said second wavelength, an image of the condensed light component being thereby formed as a point image, xi) a second light receiving optical means for condensing said light component, which has said second wavelength, said light component having been separated by said light splitting means from said light component, which has said first wavelength, an image of the condensed light component being thereby formed as a point image, xii) a first photodetector for detecting said point image, which has been formed by said first light receiving optical means, and xiii) a second photodetector for detecting said point image, which has been formed by said second light receiving optical means.

With the first scanning microscope in accordance with the present invention, on the side downstream from the analyzing phase plate, i.e. on the side opposite to the sample with respect to the analyzing phase plate, the light component, which has been polarized linearly in the first direction, includes the undiffracted light component, which has passed through the analyzing phase plate and has thereby been imparted with a phase lag, and the diffracted light component, which has been diffracted by the sample and therefore has not passed through the analyzing phase plate. (The diffracted light component is not imparted with a phase lag.) Therefore, with the first scanning microscope in accordance with the present invention, the point image, which is detected by the first photodetector, results from the interference of the undiffracted light component, which has been imparted with the phase lag, and the diffracted light component, which has not been imparted with the phase lag. Accordingly, when an image is reproduced from a signal generated by the first photodetector, a phase contrast image of the sample can be obtained.

Also, with the first scanning microscope in accordance with the present invention, on the side downstream from the analyzing phase plate, the light component, which has been polarized linearly in the second direction, has not passed through the analyzing phase plate and therefore has not been imparted with a phase lag. This light component includes the undiffracted light component and the diffracted light component, which has been diffracted by the sample. Therefore, with the first scanning microscope in accordance with the present invention, the point image, which is detected by the second photodetector, is formed by the undiffracted light component and the diffracted light component, which have not been imparted with the phase lag. Accordingly, when an image is reproduced from a signal generated by the second photodetector, an ordinary image of the sample can be obtained.

With the second scanning microscope in accordance with the present invention, the light component, which has been polarized linearly in the first direction, impinges upon the first analyzer, said light component having passed through the polarizer and having not been diffracted by the sample. This light component has not passed through the phase plate and therefore has not been imparted with a phase lag. Light, which has been imparted with a phase lag by the phase plate and which has been diffracted by the sample, also impinges upon the first analyzer. (Such light includes the light component, which has been polarized linearly in the first direction, and the light component, which has been polarized linearly in the second direction.) As a result, the undiffracted light component imparted with no phase lag and the diffracted light component imparted with a phase lag, which light components have been polarized linearly in the first direction, are radiated out of the first analyzer. Therefore, with the second scanning microscope in accordance with the present invention, the point image, which is detected by the first photodetector, results from the interference of the undiffracted light component, which has not been imparted with the phase lag, and the diffracted light component, which has been imparted with the phase lag. Accordingly, when an image is reproduced from a signal generated by the first photodetector, a phase contrast image of the sample can be obtained.

Also, with the second scanning microscope in accordance with the present invention, the undiffracted light component and the diffracted light component, which have passed through the phase plate and have thereby been imparted with a phase lag, impinge upon the second analyzer. (Each of the undiffracted light component and the diffracted light component includes the light component, which has been polarized linearly in the first direction, and the light component, which has been polarized linearly in the second direction.) The light component, which has been polarized linearly in the first direction, also impinges upon the second analyzer, said light component having not passed through the phase plate and having been diffracted by the sample. As a result, the undiffracted light component and the diffracted light component, which have been polarized linearly in the second direction and which have been imparted with a phase lag, are radiated out of the second analyzer. Therefore, with the second scanning microscope in accordance with the present invention, the point image, which is detected by the second photodetector, is formed by the undiffracted light component and the diffracted light component, which have been imparted with the phase lag. Accordingly, when an image is reproduced from a signal generated by the second photodetector, an ordinary image of the sample can be obtained.

With the third scanning microscope in accordance with the present invention, on the side downstream from the wavelength selective phase plate, i.e. on the side opposite to the sample with respect to the wavelength selective phase plate, the light component, which has the first wavelength, includes the undiffracted light component, which has passed through the wavelength selective phase plate and has thereby been imparted with a phase lag, and the diffracted light component, which has been diffracted by the sample and therefore has not passed through the wavelength selective phase plate. (The diffracted light component is not imparted with a phase lag.) Therefore, with the third scanning microscope in accordance with the present invention, the point image, which is detected by the first photodetector, results from the interference of the undiffracted light component, which has been imparted with the phase lag, and the diffracted light component, which has not been imparted with the phase lag. Accordingly, when an image is reproduced from a signal generated by the first photodetector, a phase contrast image of the sample can be obtained.

Also, with the third scanning microscope in accordance with the present invention, on the side downstream from the wavelength selective phase plate, the light component, which has the second wavelength, has not passed through the wavelength selective phase plate and therefore has not been imparted with a phase lag. This light component includes the undiffracted light component and the diffracted light component, which has been diffracted by the sample. Therefore, with the third scanning microscope in accordance with the present invention, the point image, which is detected by the second photodetector, is formed by the undiffracted light component and the diffracted light component, which have not been imparted with the phase lag. Accordingly, when an image is reproduced from a signal generated by the second photodetector, an ordinary image of the sample can be obtained.

With the fourth scanning microscope in accordance with the present invention, the light component, which has the first wavelength, impinges upon the first light receiving side filter, said light component having passed through the light projecting side filter and having not been diffracted by the sample. This light component has not passed through the phase plate and therefore has not been imparted with a phase lag. Light, which has been imparted with a phase lag by the phase plate and which has been diffracted by the sample, also impinges upon the first light receiving side filter. (Such light includes the light component, which has the first wavelength, and the light component, which has the second wavelength.) As a result, the undiffracted light component imparted with no phase lag and the diffracted light component imparted with a phase lag, which light components have the first wavelength, are radiated out of the first light receiving side filter. Therefore, with the fourth scanning microscope in accordance with the present invention, the point image, which is detected by the first photodetector, results from the interference of the undiffracted light component, which has not been imparted with the phase lag, and the diffracted light component, which has been imparted with the phase lag. Accordingly, when an image is reproduced from a signal generated by the first photodetector, a phase contrast image of the sample can be obtained.

Also, with the fourth scanning microscope in accordance with the present invention, the undiffracted light component and the diffracted light component, which have passed through the phase plate and have thereby been imparted with a phase lag, impinge upon the second light receiving side filter. (Each of the undiffracted light component and the diffracted light component includes the light component, which has the first wavelength, and the light component, which has the second wavelength.) The light component, which has the first wavelength, also impinges upon the second light receiving side filter, said light component having not passed through the phase plate, but having passed through the light projecting side filter, and having been diffracted by the sample. As a result, the undiffracted light component and the diffracted light component, which have the second wavelength and which have been imparted with a phase lag, are radiated out of the second light receiving side filter. Therefore, with the fourth scanning microscope in accordance with the present invention, the point image, which is detected by the second photodetector, is formed by the undiffracted light component and the diffracted light component, which have been imparted with the phase lag. Accordingly, when an image is reproduced from a signal generated by the second photodetector, an ordinary image of the sample can be obtained.

As described above, with the first to fourth scanning microscopes in accordance with the present invention, by carrying out an easy operation for selecting whether the signal generated by the first photodetector or the signal generated by the second photodetector is to be utilized, an ordinary image or a phase contrast image of a sample can be obtained selectively.

Also, the point image formed by the undiffracted light component and the diffracted light component, whose phases coincide with each other, and the point image formed by the undiffracted light component and the diffracted light component, either one of which has been imparted with a phase lag, are obtained simultaneously. Therefore, by utilizing both the signal generated by the first photodetector and the signal generated by the second photodetector, an ordinary image and a phase contrast image of a sample at strictly the same instant can be obtained.

BRIEF DESCRIPTION OF THE DRAWINGS

FIG. 13 is a plan view showing a compound filter plate employed in the third embodiment of the scanning microscope in accordance with the present invention, FIG. 14 is a plan view showing a different compound filter plate employed in the third embodiment of the scanning microscope in accordance with the present invention.

DESCRIPTION OF THE PREFERRED EMBODIMENTS

The present invention will hereinbelow be described in further detail with reference to the accompanying drawings.

Figure 1:
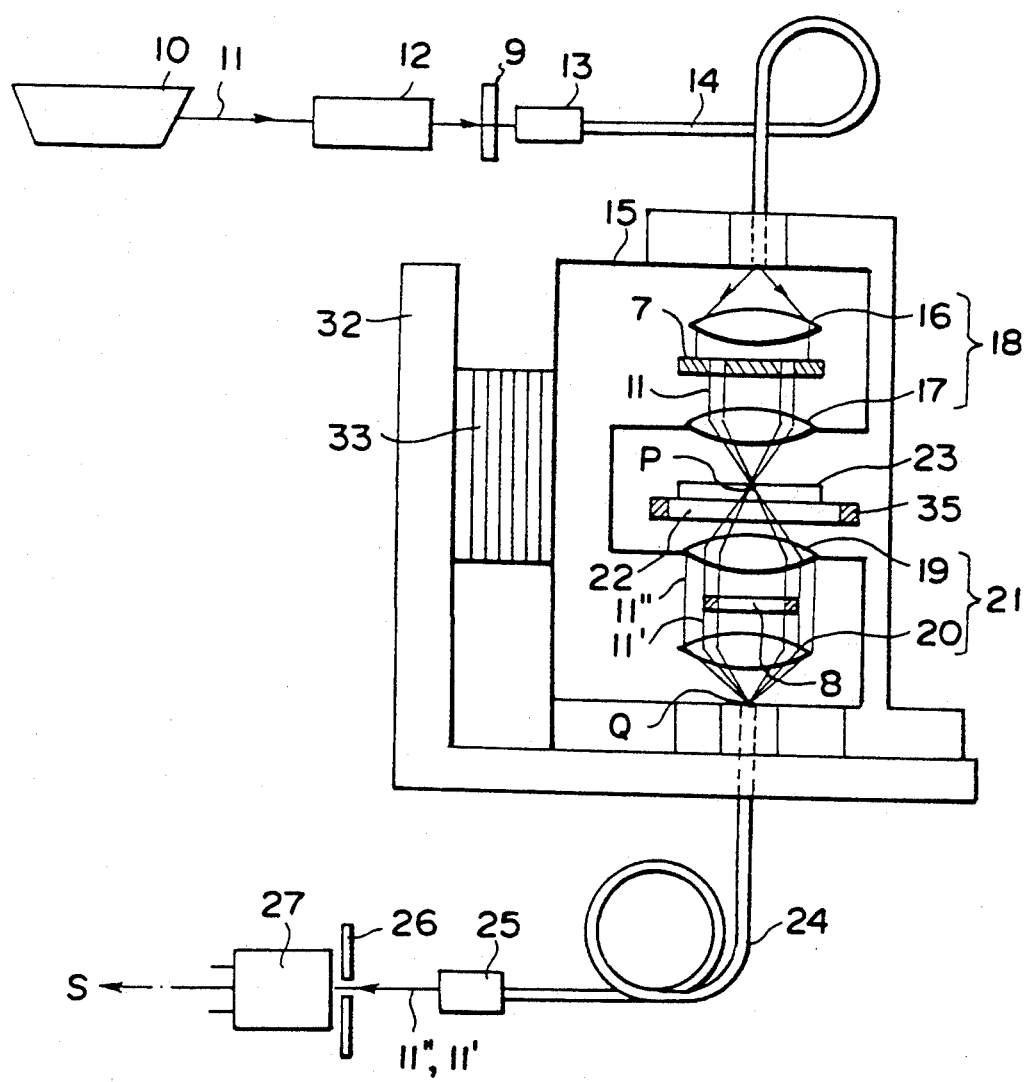
FIG. 1 is a schematic front view showing a first embodiment of the confocal scanning type of phase contrast microscope in accordance with the present invention.
Figure 2:
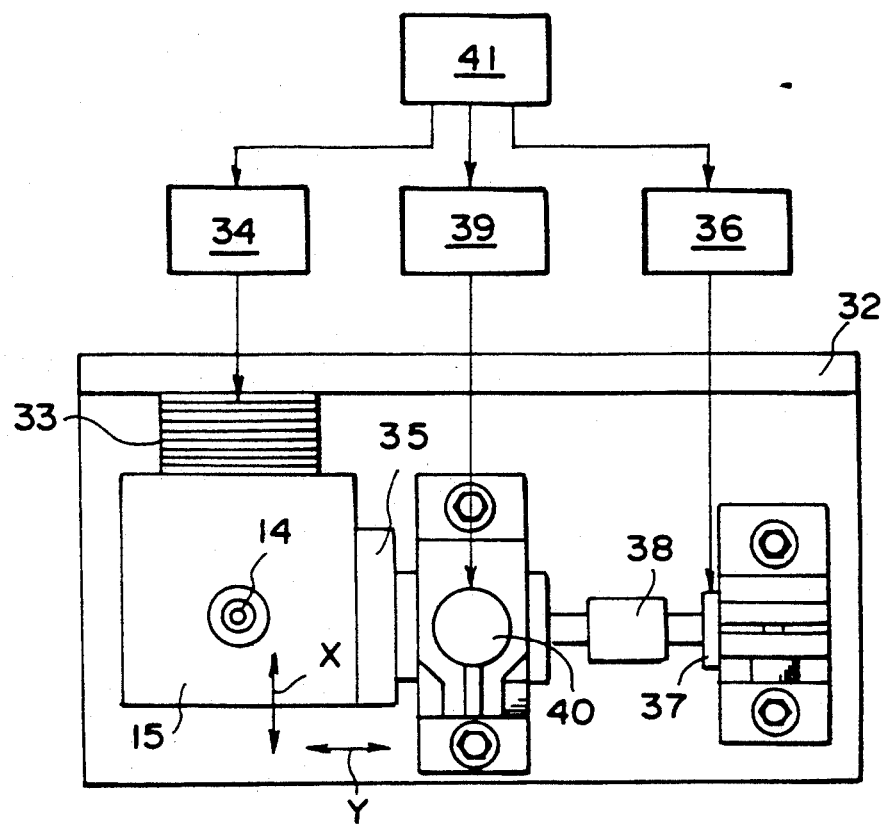
FIGS. 2 and 3 are a plan view and a side view showing the major part of the confocal scanning type of phase contrast microscope shown in FIG. 1, FIGS. 4 and 5 are schematic front view showing second and third embodiments of the confocal scanning type of phase contrast microscope in accordance with the present invention.
Figure 3:
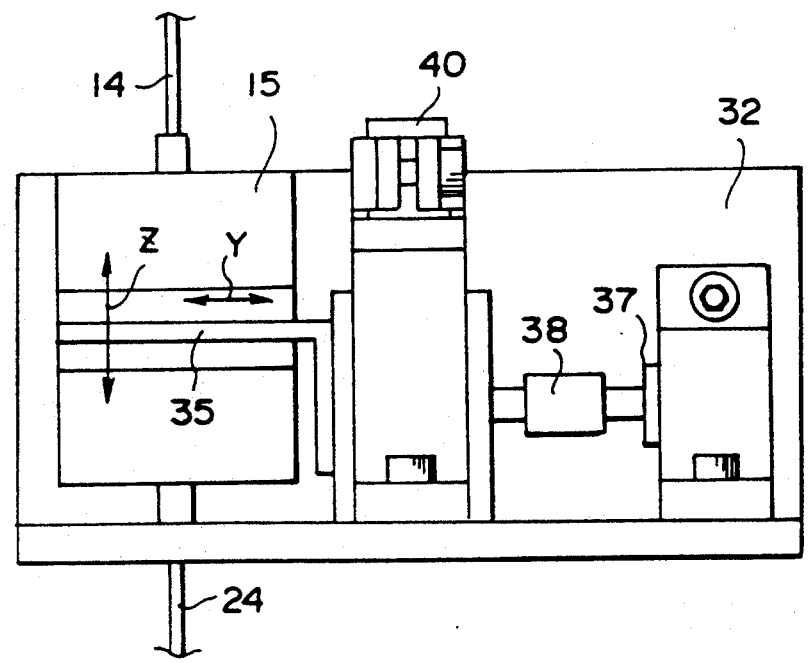

FIG. 1 shows a first embodiment of the confocal scanning type of phase contrast microscope in accordance with the present invention. This embodiment is of the transmission type. FIGS. 2 and 3 show a scanning mechanism employed in this embodiment. As illustrated in FIG. 1, a monochromatic light laser 10 produces a laser beam 11, which serves as a light beam to be irradiated to a sample. A beam compressor 12 adjusts the beam diameter of the laser beam 11. The laser beam 11 then passes through a halfwave plate 9 for adjusting the plane of polarization. The laser beam 11, which has passed through the halfwave plate 9, is condensed by a distributed index lens 13 and impinges upon a polarization plane keeping optical fiber 14.

One edge of the optical fiber 14 is secured to a movable member 15. The laser beam 11, which has been guided through the optical fiber 14, is radiated out of the edge of the optical fiber 14, which is secured to the movable member 15. At this time, the edge of the optical fiber 14 radiates the laser beam 11 like a point light source. A light projecting optical means 18 and a light receiving optical means 21 are secured to the movable member 15 such that their optical axes align with each other. The light projecting optical means 18 is composed of a collimator lens 16 and an objective lens 17. The light receiving optical means 21 is composed of an objective lens 19 and a condensing lens 20. Also, a sample supporting member 22, which is independent of the movable member 15, is located between the light projecting optical means 18 and the light receiving optical means 21.

A ring stop 7 is located between the collimator lens 16 and the objective lens 17 of the light projecting optical means 18. A ring-like phase plate (in this case, a quarter-wave plate) 8 is located between the objective lens 19 and the condensing lens 20 of the light receiving optical means 21. The phase plate 8 and the ring stop 7 constitute a phase difference optical means. The ring stop 7 is located in the front focal plane of the objective lens 17, and the phase plate 8 is located in conjugate relation with the ring stop 7.

The laser beam 11 is collimated by the collimator lens 16, and the collimated laser beam 11 is then converted by the ring stop 7 into an annular band-like laser beam. The laser beam 11 is then condensed by the objective lens 17. In this manner, an image of the condensed laser beam 11 is formed as a small light spot P on a sample 23, which is placed on the sample supporting member 22. A laser beam (an undiffracted light component) 11', which has passed through the sample 23, is collimated by the objective lens 19 of the light receiving optical means 21, and the collimated laser beam 11' impinges upon the phase plate 8. The ring-like phase plate 8 exactly overlaps the annular band-like laser beam (the undiffracted light component) 11'. Specifically, the inner diameter of the ring-like phase plate 8 is equal to the product of the inner diameter of the ring stop 7 and the total magnification of the objective lenses 17 and 19. Also, the outer diameter of the ring-like phase plate 8 is equal to the product of the outer diameter of the ring stop 7 and the total magnification of the objective lenses 17 and 19. A thin layer for appropriately absorbing the undiffracted light component 11' is overlaid on the surface part of the phase plate 8. The diffracted light component 11'', which has been diffracted by the sample 23 and the phase of which has lagged by approximately λ/4, primarily passes through the side outward from the phase plate 8.

The diffracted light component 11'' and the undiffracted light component 11' are condensed by the condensing lens 20 and interfere with each other. As a result, a point image Q is formed by the diffracted light component 11″ and the undiffracted light component 11′. One edge of a polarization plane keeping optical fiber 24 is located at the position, at which the point image Q is formed. The undiffracted light component 11′ and the diffracted light component 11″ impinge upon the edge of the optical fiber 24 and enters the optical fiber 24. The edge of the optical fiber 24 is secured to the movable member 15, and the other edge thereof is connected to a distributed index lens 25. The undiffracted light component 11′ and the diffracted light component 11″, which have been guided through the optical fiber 24, are radiated out of the other edge of the optical fiber 24 and are condensed by the distributed index lens 25.

Thereafter, the undiffracted light component 11′ and the diffracted light component 11″ pass through a pinhole of an aperture pinhole plate 26 and are detected by a photodetector 27, which may be constituted of a photomultiplier, or the like. With this embodiment, wherein the phase difference optical means is constituted in the manner described above, the brightness of the image formed by the undiffracted light component 11′ and the diffracted light component 11″ varies in accordance with the phase of the diffracted light component 11″ (i.e. in accordance with the phase information of the part of the sample 23 irradiated to the laser beam 11). Therefore, a light amount signal S corresponding to the phase information of the sample 23 is generated by the photodetector 27.

How the sample 23 is two-dimensionally scanned with the light spot P of the laser beam 11 will be described hereinbelow with reference to FIGS. 2 and 3. FIG. 2 is a plan view showing the movable member 15 and the surrounding parts shown in FIG. 1. FIG. 3 is a right side view showing the movable member 15 and the surrounding parts shown in FIG. 1. The movable member 15 is secured to a laminated piezo-electric device 33, which is in turn secured to a frame 32. The laminated piezo-electric device 33 receives operating electric power from a piezo-electric device operating circuit 34 and reciprocally moves the movable member 15 at high speeds in the main scanning directions indicated by the double headed arrow X. By way of example, the frequency of the reciprocal movement is set as being 10kHz. In such cases, if the main scanning width is equal to 100μm, the main scanning speed will be equal to $$10 \times 10^3 \times 100 \times 10^{-6} \times 2 = 2 \ m/s$$

The optical fibers 14 and 24 are flexible and allow the movable member 15 to move while the laser beam 11 is being guided through the optical fiber 14 and the undiffracted light component 11′ and the diffracted light component 11″ are being guided through the optical fiber 24.

The sample supporting member 22 is secured to a two-dimensionally movable stage 35. The twodimensionally movable stage 35 is connected to a micrometer 38, which is in turn connected to a pulse motor 37. The pulse motor 37 receives an operating current from a motor operating circuit 36. The two-dimensionally movable stage 35 is reciprocally moved by the pulse motor 37 in the sub-scanning directions indicated by the double headed arrow Y. In this manner, the sample supporting member 22 is moved with respect to the movable member 15, and the sample 23 is scanned with the light spot P in the sub-scanning directions indicated by the double headed arrow Y. The sub-scanning directions are normal to the main scanning directions indicated by the double headed arrow X. By way of example, the time required for the sub-scanning is set as being 1/20 second. In such cases, if the sub-scanning width is equal to 100μm, the sub-scanning speed will be equal to $$20 \times 100 \times 10^{-6} = 0.002 \ m/s$$
$$= 2 \ mm/s$$

Specifically, the sub-scanning speed is sufficiently lower than the main scanning speed. When the sub-scanning speed is as low as this level, the sample 23 does not fly out of its correct position when the sample supporting member 22 is moved.

In the manner described above, the sample 23 is two-dimensionally scanned with the light spot P. As a result, the time-serial signal S representing the two-dimensional image of the sample 23 is obtained. By way of example, the signal S is integrated with a predetermined period, and a signal divided into picture elements is thereby obtained. When an image is reproduced from the signal S by an image reproducing means, such as a CRT display device, an image can be obtained which represents the phase information of the sample 23 in terms of brightness and darkness.

In this embodiment, the undiffracted light component 11′ is passed through the quarter-wave plate 8. Therefore, a positive phase contrast image is obtained, in which the phase variation is illustrated brightly. In cases where a phase plate for delaying the phase by 3λ/4 (3π/2) is employed in lieu of the phase plate 8, a negative phase contrast image can be obtained, in which the phase variation is illustrated darkly.

Also, in this embodiment, the undiffracted light component 11′ is passed through the phase plate 8 Alternatively, the diffracted light component 11″ may be passed through a phase plate.

Additionally, in this embodiment, the two-dimensionally movable stage 35 is also moved by a pulse motor 40 in the directions indicated by the double headed arrow Z (i.e. along the optical axis of the light projecting optical means 18 and the light receiving optical means 21), which directions are normal to the main scanning directions indicated by the double headed arrow X and the sub-scanning directions indicated by the double headed arrow Y. For this purpose, a motor operating circuit 39 feeds an operating current to the pulse motor 40. The two-dimensional scanning with the light spot P is carried out each time the two-dimensionally movable stage 35 is moved a predetermined distance along the directions indicated by the double headed arrow Z. In this manner, only the information at the focusing plane can be detected by the photodetector 27. The signal generated by the photodetector 27 may be stored on a frame memory. In this manner, a signal can be obtained which represents a three-dimensional image within the range of movement of the sample 23 along the directions indicated by the double headed arrow Z.

A control circuit 41 feeds synchronizing signals to the piezo-electric device operating circuit 34 and the motor operating circuits 36, 39. The synchronizing signals synchronize the scanning with the light spot P in the main and sub-scanning directions, and the movement of the sample supporting member 22 in the directions indicated by the double headed arrow Z with each other.

The embodiment described above may be modified in various ways. For example, a microscope objective lens, or the like, may be employed in lieu of the distributed index lens 25, which serves as a condensing element on the side of the light receiving optical means 21. A d.c. motor provided with an encoder may be employed in lieu of the pulse motor 37, which reciprocally moves the sample supporting member 22 secured to the two-dimensionally movable stage 35 in the sub-scanning directions indicated by the double headed arrow Y. Instead of the sub-scanning with the light spot P being carried out by the movement of the sample supporting member 22, the sub-scanning with the light spot P may be effected by moving the movable member 15. Additionally, instead of the laminated piezo-electric device 33 being used to move the movable member 15, a scanning technique utilizing a voice coil, a tuning fork, natural oscillation of a solid with ultrasonic waves, or the like, may be utilized to move the movable member 15.

Figure 4:
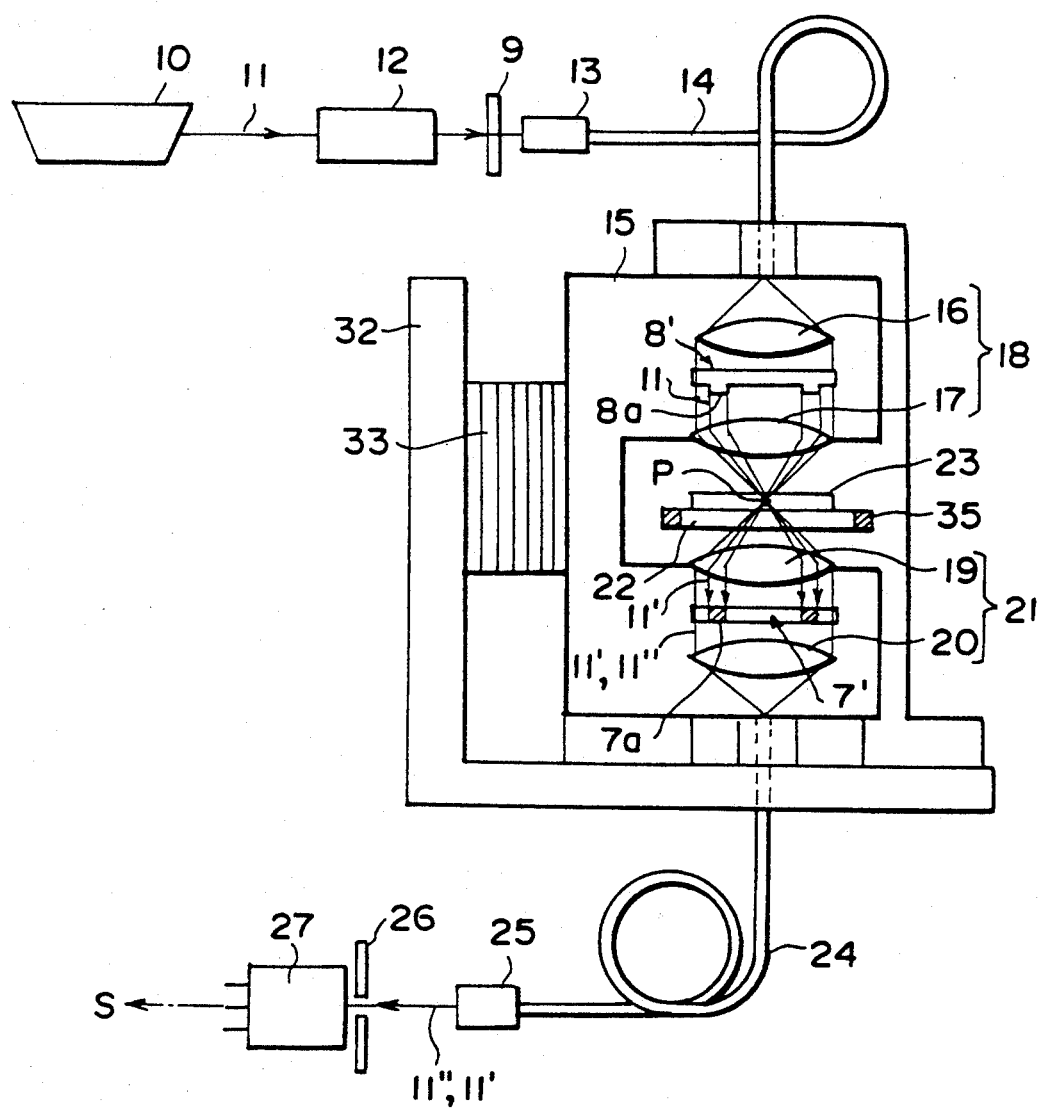

A second embodiment of the confocal scanning type of phase contrast microscope in accordance with the present invention will be described hereinbelow with reference to FIG. 4. In FIG. 4, similar elements are numbered with the same reference numerals with respect to FIGS. 1, 2, and 3.

In this embodiment, a phase plate 8' is located on the side of the light projecting optical means 18, and a ring stop 7' is located on the side of the light receiving optical means 21. The phase plate 8' has a ring-like part 8a. The ring-like part 8a delays the phase of part of the laser beam 11, which part passes through the ring-like part 8a, by $\lambda/4$. A thin layer for absorbing the laser beam 11 is overlaid on the part of the phase plate 8' other than the ring-like part 8a. The ring stop 7' has a ring-like part 7a, which blocks light. The ring stop 7' is located such that the laser beam (the undiffracted light component) 11', which has passed through the ring-like part 8a of the phase plate 8' and which has then passed through the sample 23, impinges exactly upon the ring-like part 7a. Specifically, the phase plate 8' is located in the front focal plane of the objective lens 17, and the ring stop 7' is located in conjugate relation with the phase plate 8'.

With this embodiment, the laser beam (the undiffracted light component) 11', which has been imparted with a phase lag of $\lambda/4$ by the ring-like part 8a of the phase plate 8' and which has then passed through the sample 23, is blocked by the ring stop 7'. Therefore, the laser beam (the undiffracted light component) 11', which has passed through the part of the phase plate 8' other than the ring-like part 8a and which has then passed through the sample 23, is condensed by the condensing lens 20. The diffracted light component 11'', which has passed through the ring-like part 8a of the phase plate 8' and has been imparted thereby with a phase lag of $\lambda/4$ and which has then been diffracted by the sample 23, is also condensed by the condensing lens 20. The undiffracted light component 11' and the diffracted light component 11'', which have thus been condensed by the condensing lens 20, interfere with each other. In this case, the phase of the diffracted light component 11'' lags by approximately $\lambda/2$ from the phase of the undiffracted light component 11'. Therefore, a signal S is obtained which represents a negative phase contrast image.

Figure 5:
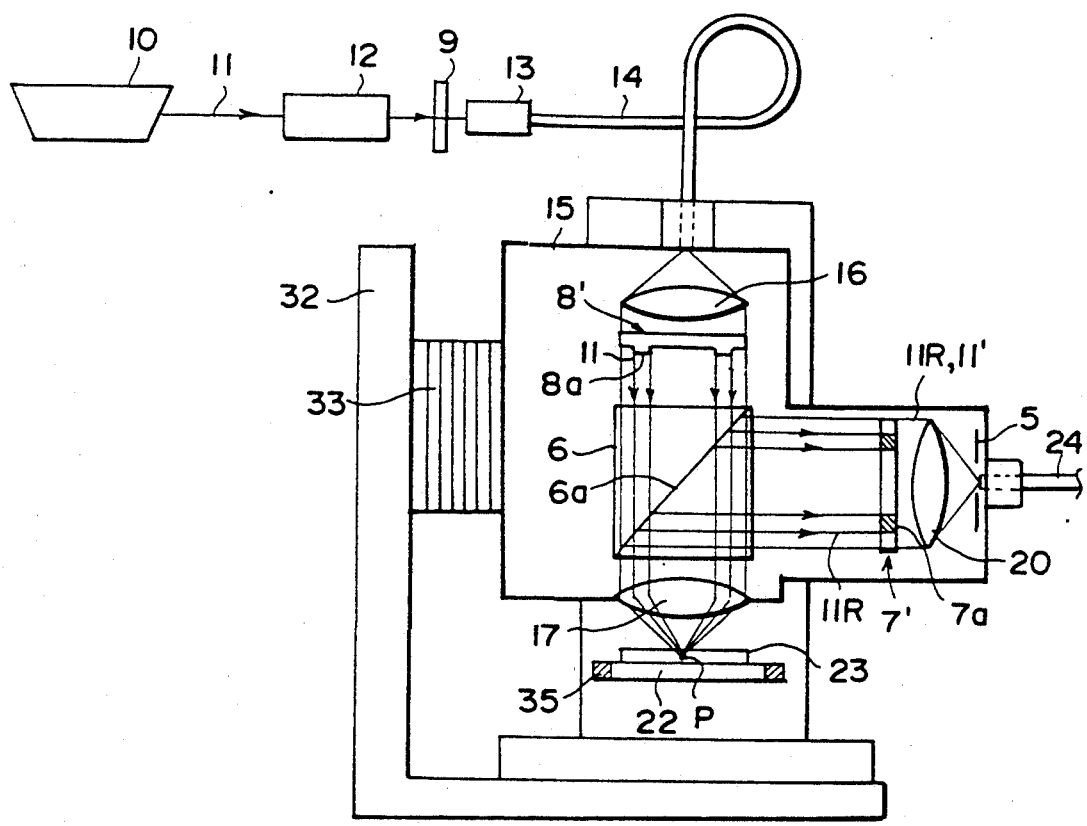

A third embodiment of the confocal scanning type of phase contrast microscope in accordance with the present invention will be described hereinbelow with reference to FIG. 5. In FIG. 5, similar elements are numbered with the same reference numerals with respect to FIGS. 1, 2, and 3. This embodiment is of the reflection type. A beam splitter 6 is located between a phase plate 8', which is the same as the phase plate 8' employed in the embodiment of FIG. 4, and the objective lens 17.

The laser beam 11 passes through the collimator lens 16 and the phase plate 8', and then passes through a film surface 6a of the beam splitter 6. The laser beam 11, which has passed through the film surface 6a, impinges upon the objective lens 17 and is converged thereby into a light spot P. The laser beam (the undiffracted light component) 11R, which has been imparted with a phase lag of $\lambda/4$ by the ring-like part 8a of the phase plate 8' and which has then been reflected by the sample 23, is reflected by the film surface 6a and is then blocked by the ring stop 7'. Therefore, the laser beam (the undiffracted light component) 11R, which has passed through the part of the phase plate 8' other than the ring-like part 8a and which has then been reflected by the sample 23, is reflected by the film surface 6a and is then condensed by the condensing lens 20. The diffracted light component 11'', which has passed through the ring-like part 8a of the phase plate 8' and has been imparted thereby with a phase lag of $\lambda/4$ and which has then been diffracted and reflected by the sample 23, is also reflected by the film surface 6a and is then condensed by the condensing lens 20. The undiffracted light component 11R and the diffracted light component 11'', which have thus been condensed by the condensing lens 20, interfere with each other.

As described above, in this embodiment, the objective lens 17 is utilized for both the light projecting optical means and the light receiving optical means. As illustrated in FIG. 5, an aperture pinhole plate 5, which has a pinhole having a diameter equal to the diameter of the light spot condensed by the condensing lens 20, should preferably be located in front of the light entry edge of the polarization plane keeping optical fiber 24, which is located on the light receiving side.

In the aforesaid embodiments of the confocal scanning type of phase contrast microscope in accordance with the present invention, the optical fibers 14 and 24 are connected respectively to the light projecting optical means 18 and the light receiving optical means 21. Alternatively, a small device, such as a semiconductor laser, may be utilized as the light source, and a small photodetector, such as a photodiode, may be utilized as the photodetector 27. The small light source and the small photodetector may be supported on the movable member 15.

Embodiments of the scanning microscope in accordance with the present invention will be described hereinbelow.

Figure 6:
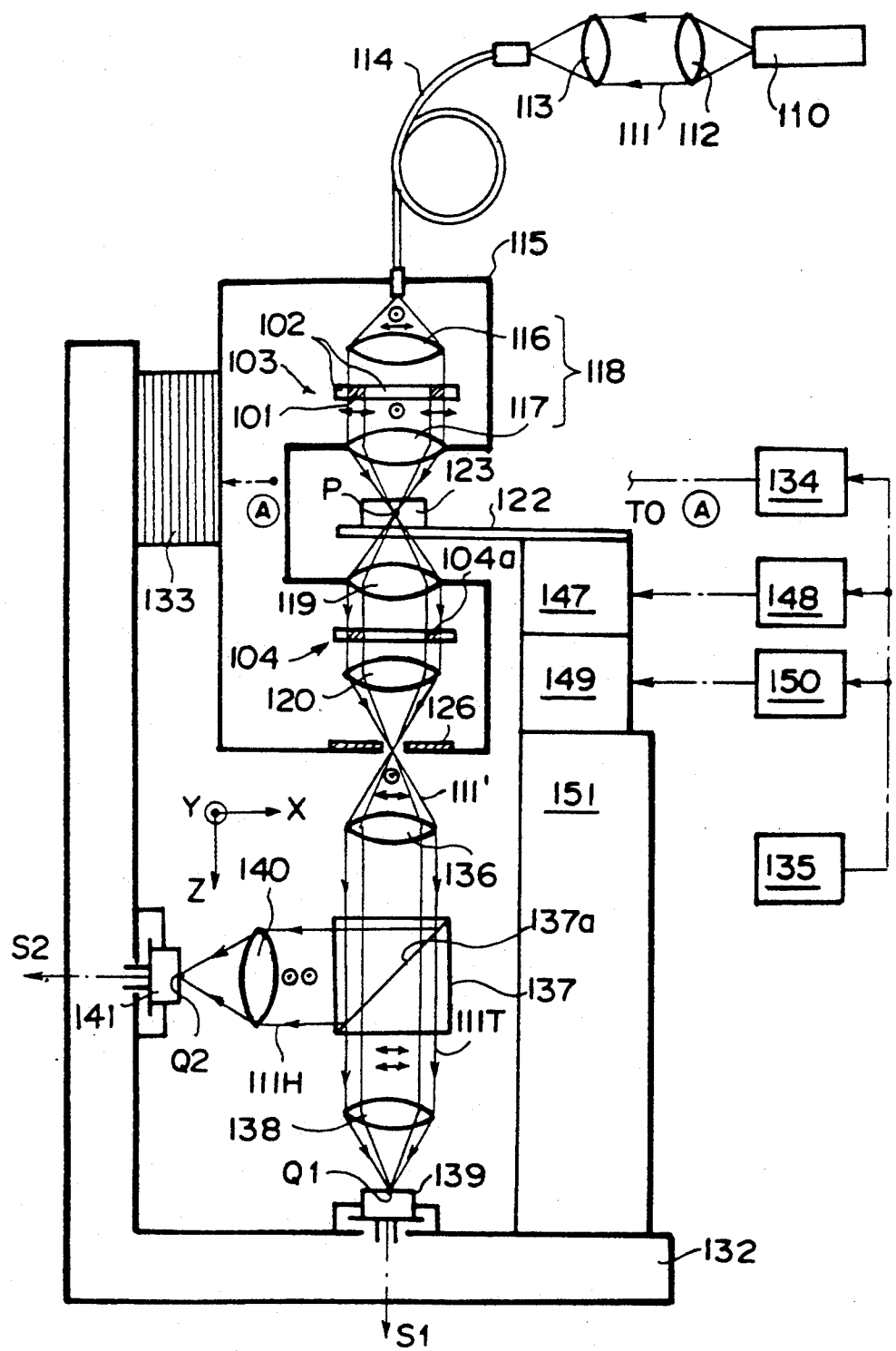
FIG. 6 is a partially cutaway front view showing a first embodiment of the scanning microscope in accordance with the present invention.

FIG. 6 shows a first embodiment of the scanning microscope in accordance with the present invention. This embodiment is of the confocal scanning transmission type. As illustrated in FIG. 6, a monochromatic light laser 110 produces a laser beam 111, which serves as a light beam to be irradiated to a sample. The unpolarized laser beam 111 is collimated by a collimator lens 112. The collimated laser beam 111 is then condensed by a converging lens 113 and impinges upon an optical fiber 114.

Figure 7:
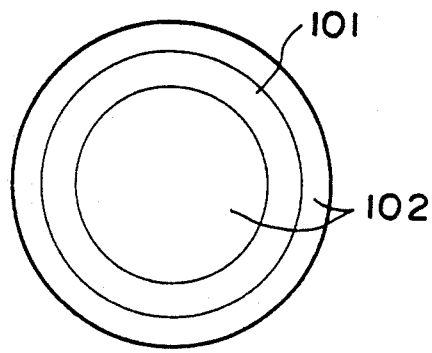
FIG. 7 is a plan view showing a compound polarizing plate employed in the first embodiment of the scanning microscope in accordance with the present invention.

One edge of the optical fiber 114 is secured to a movable member 115. The laser beam 111, which has been guided through the optical fiber 114, is radiated out of the edge of the optical fiber 114, which is secured to the movable member 115. At this time, the edge of the optical fiber 114 radiates the laser beam 111 like a point light source. A light projecting optical means 118, which is composed of a collimator lens 116 and an objective lens (a condensing lens) 117, is secured to the movable member 115. A compound polarizing plate 103 is located between the collimator lens 116 and the objective lens 117. As illustrated in FIG. 7, the compound polarizing plate 103 is composed of a first ring-like polarizer 101 and a second polarizer 102. The second polarizer 102 is constituted of two parts which are located respective on the side inward from the first polarizer 101 and on the side outward from the first polarizer 101. The first polarizer 101 transmits only a light component, which has been polarized linearly in the transverse direction in FIG. 6. This direction of polarization will hereinbelow be referred to as a first direction and is indicated by the double headed arrow in FIG. 6. The second polarizer 102 transmits only a light component, which has been polarized linearly in the direction normal to the plane of the sheet of FIG. 6. The direction of polarization, which is normal to the plane of the sheet of FIG. 6, will hereinbelow be referred to as a second direction and is indicated by a circle having a dot in the middle in FIG. 6.

In this embodiment, the monochromatic light laser 110, which produces the unpolarized laser beam 111, is employed as a light source. Alternatively, a light source may be employed which produces light, which has been polarized linearly in a certain direction, and light, which has been polarized linearly in a direction intersecting perpendicularly to the certain direction.

Figure 8:
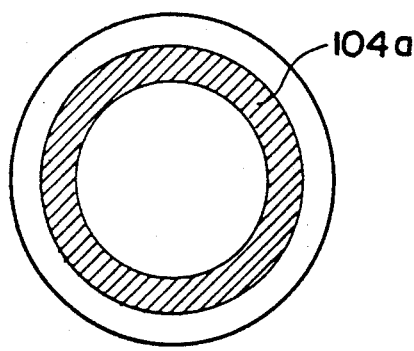
FIG. 8 is a plan view showing an analyzing phase plate employed in the first embodiment of the scanning microscope in accordance with the present invention.

An objective lens 119 and a condensing lens 120 are also secured to the movable member 115. A disk 104 is located between the objective lens 119 and the condensing lens 120. As illustrated in FIG. 8, the disk 104 is provided with a ring-like analyzing phase plate 104a, which serves as an analyzer and a phase plate. The light projecting optical means 118 and the lenses 119, 120 are secured to the movable member 115 such that their optical axes align with each other. Also, a sample supporting member 122, which is independent of the movable member 115, is located between the light projecting optical means 118 and the objective lens 119. The sample supporting member 122 and the movable member 115 are supported on a frame 132 in the manner which will be described later. The compound polarizing plate 103 is located in the front focal plane of the objective lens 117, and the disk 104 is located in conjugate relation with the compound polarizing plate 103.

The laser beam 111 is collimated by the collimator lens 116, and the collimated laser beam 111 impinges upon the compound polarizing plate 103. Of the laser beam 111, only the light component, which has been polarized linearly in the first direction, passes through the first polarizer 101. Also, only the light component, which has been polarized linearly in the second direction, passes through the second polarizer 102. The first polarizer 101 has the shape described above. Therefore, the part of the laser beam 111, which has passed through the first polarizer 101, takes on the form of an annular band-like laser beam. The laser beam 111, which is now composed of only the two polarized light components, is condensed by the objective lens 117. In this manner, a small light spot P is formed on the sample 123 (i.e. on the surface or in the inside of the sample 123), which is placed on the sample supporting member 122.

The laser beam (the undiffracted light component) 111', which has passed through the sample 123, is collimated by the objective lens 119. The collimated laser beam 111' passes through the disk 104, and is then converged by the condensing lens 120. At the position at which the collimated laser beam 111' converges, a pinhole plate 126 is secured to the movable member 115. The laser beam 111' passes through the pinhole of the pinhole plate 126. Thereafter, the laser beam 111' impinges upon a collimator lens 136, which is secured to the frame 132. The laser beam 111', which has been collimated by the collimator lens 136, impinges upon a polarization beam splitter 137 having a film surface 137a. Of the laser beam 111', the light component, which impinges as P-polarized light upon the film surface 137a, (i.e. the light component, which has been polarized linearly in the first direction) passes through the film surface 137a. Also, the light component, which impinges as S-polarized light upon the film surface 137a, (i.e. the light component, which has been polarized linearly in the second direction) is reflected by the film surface 137a.

The light component 111T, which has passed through the film surface 137a, is condensed by a condensing lens 138, which constitutes a first light receiving optical means together with the lenses 119, 120, and 136. In this manner, a point image Q1 is formed by the light component 111T. The point image Q1 is detected by a first photodetector 139, which may be constituted of a photomultiplier, or the like. The first photodetector 139 generates a signal S1, which represents the brightness of the point image Q1. The light component 111H, which has been reflected by the film surface 137a, is condensed by a condensing lens 140, which constitutes a second light receiving optical means together with the lenses 119, 120, and 136. In this manner, a point image Q2 is formed by the light component 111H. The point image Q2 is detected by a second photodetector 141, which may be constituted of a photomultiplier, or the like. The second photodetector 141 generates a signal S2, which represents the brightness of the point image Q2.

How the sample 123 is two-dimensionally scanned with the light spot P of the laser beam 111 will be described hereinbelow.

A laminated piezo-electric device 133 is located between the movable member 155 and the frame 132. The laminated piezo-electric device 133 receives operating electric power from a piezo-electric device operating circuit 134 and reciprocally moves the movable member 115 at high speeds in the main scanning directions indicated by the arrow X. The optical fiber 114 is flexible and allows the movable member 115 to move while the laser beam 111 is being guided through the optical fiber 114.

Laminated piezo-electric devices 147 and 149 are located between the sample supporting member 122 and the frame 132. The laminated piezo-electric device 147 receives operating electric power from a piezo-electric device operating circuit 148 and reciprocally moves the sample supporting member 122 at high speeds in the sub-scanning directions Y, which directions are normal to the plane of the sheet of FIG. 6. In this manner, the sample supporting member 122 is moved with respect to the movable member 115, and the sample 123 is scanned with the light spot P in the sub-scanning directions Y, which are normal to the main scanning directions indicated by the arrow X. The sub-scanning speed is sufficiently lower than the main scanning speed. Therefore, the sample 123 does not fly out of its correct position when the sample supporting member 122 is moved.

In the manner described above, the sample 123 is two-dimensionally scanned with the light spot P. As a result, the serial signals S1 and S2 representing the two-dimensional enlarged images of the sample 123 are obtained from the first photodetector 139 and the second photodetector 141. By way of example, each of the signals S1 and S2 is sampled with a predetermined period, and a signal divided into picture elements is thereby obtained.

The size of the ring-like analyzing phase plate 104a is adjusted such that all of the light component, which has passed through the first polarizer 101 and which has then passed through the sample 123, (i.e. the undiffracted light component, which has been polarized linearly in the first direction) can impinge upon the ring-like analyzing phase plate 104a. The analyzing phase plate 104a is composed of a ring-like phase plate (a ring-like quarter-wave plate) and a ring-like analyzer, which are adhered to each other. The ring-like analyzer transmits only the light component, which has been polarized linearly in the first direction. The part of the disk 104 other than the ring-like analyzing phase plate 104a is constituted of a transparent material, which does not serve as an analyzer or a phase plate.

Therefore, on the side downstream from the analyzing phase plate 104a, i.e. on the side opposite to the sample 123 with respect to the analyzing phase plate 104a, the light component, which has been polarized linearly in the first direction, includes the undiffracted light component, which has passed through the analyzing phase plate 104a and has thereby been imparted with a phase lag, and the diffracted light component, which has been diffracted by the sample 123 and therefore has not passed through the analyzing phase plate 104a. (The diffracted light component is not imparted with a phase lag.) Specifically, the light component 111T, which has passed through the film surface 137a of the polarization beam splitter 137, comprises the undiffracted light component and the diffracted light component, which have been polarized linearly in the first direction. Therefore, the point image Q1, which is detected by the first photodetector 139, results from the interference of the undiffracted light component, which has been imparted with the phase lag, and the diffracted light component, which has not been imparted with the phase lag Also, on the side downstream from the analyzing phase plate 104a, the light component, which has been polarized linearly in the second direction, has not passed through the analyzing phase plate 104a and therefore has not been imparted with a phase lag. This light component includes the undiffracted light component and the diffracted light component, which has been diffracted by the sample 123. All of this light component is reflected by the film surface 137a of the polarization beam splitter 137. Therefore, the point image Q2, which is detected by the second photodetector 141, is formed by the undiffracted light component and the diffracted light component, which have not been imparted with the phase lag.

Therefore, the enlarged image of the sample 123, which is represented by the signal S1 generated by the first photodetector 139, is obtained as a phase contrast image in which the phase information of the sample 123 is illustrated in terms of brightness and darkness. The enlarged image of the sample 123, which is represented by the signal S2 generated by the second photodetector 141, is obtained as an ordinary image. Accordingly, by feeding the signals S1 and S2 respectively to independent image reproducing apparatuses, both the phase contrast image and the ordinary image of the sample 123 at exactly the same instant can be reproduced. Alternatively, in order for the phase contrast image and the ordinary image of the sample 123 at exactly the same instant to be reproduced, one of the signals S1 and S2 may be fed into a single image reproducing apparatus, and the other signal may be stored on a storage means. The other signal may then be read from the storage means and fed into the image reproducing apparatus.

In cases where only either one of the ordinary image and the phase contrast image of the sample 123 is to be obtained, the signal S1 or the signal S2 may be selectively fed via a switching means into a single image reproducing apparatus. In such cases, change-over between the ordinary image and the phase contrast image can be carried out very easily by operating the switching means.

In this embodiment, the undiffracted light component 111' is passed through the phase plate 104a constituted of a quarter-wave plate. Therefore, a positive phase contrast image is obtained, in which the phase variation is illustrated brightly. In cases where a phase plate for delaying the phase by $3\lambda/4$ $(3\lambda/2)$ is employed in lieu of the quarter-wave plate, a negative phase contrast image can be obtained, in which the phase variation is illustrated darkly.

In this embodiment, the photodetectors 139 and 141 are secured to the frame 132. During the main scanning with the laser beam 111, the movable member 115 is moved with respect to the frame 132. Therefore, photodetectors having a comparatively wide light receiving face are employed as the photodetectors 139 and 141. Alternatively, the photodetectors 139, 141, the lenses 136, 138, 140, and the polarization beam splitter 137 may be secured to the movable member 115. When the laser beam (the undiffracted light component) 111', which has passed through the sample 123, is detected via the pinhole plate 126, a halo of the laser beam 111' and other unnecessary light can be blocked by the pinhole plate 126.

The upper edge of the laminated piezo-electric device 149 is secured to the laminated piezo-electric device 147 for the sub-scanning. The lower edge of the laminated piezo-electric device 149 is secured to a coarsely movable stage 151, which is in turn secured to the frame 132. The laminated piezo-electric device 149 receives operating electric power from a piezo-electric device operating circuit 150 and moves the laminated piezo-electric device 147, which supports the sample supporting member 122, in the directions indicated by the arrow Z, which directions are normal to the main scanning directions indicated by the arrow X and the sub-scanning directions Y. The two-dimensional scanning with the light spot P is carried out each time the sample supporting member 122 is moved a predetermined distance along the directions indicated by the arrow Z. In this manner, only the information at the focusing plane can be detected by the photodetectors 139 and 141. The signals S1 and S2 generated by the photodetectors 139 and 141 may be stored on a frame memory. In this manner, signals can be obtained which represent the image information at every focusing plane within the range of movement of the sample 123 along the directions indicated by the arrow Z.

A control circuit 135 feeds synchronizing signals to the piezo-electric device operating circuits 134, 148, and 150. The synchronizing signals synchronize the scanning with the light spot P in the main and sub-scanning directions, and the movement of the sample supporting member 122 in the directions along the optical axis with each other. The coarsely movable stage 151 can be moved manually or by an operating means in the directions Y. By thus moving the sample supporting member 122 by the coarsely movable stage 151, the sample 123 can be easily replaced by a new one.

Instead of the sub-scanning with the light spot P being carried out by the movement of the sample supporting member 122, the sub-scanning with the light spot P may be effected by moving the movable member 115. Also, instead of the laminated piezo-electric devices being used to move the movable member 115 and the sample supporting member 122, scanning techniques utilizing a voice coil, a tuning fork, natural oscillation of a solid with ultrasonic waves, or the like, may be utilized to move the movable member 115 and the sample supporting member 122.

Figure 9:
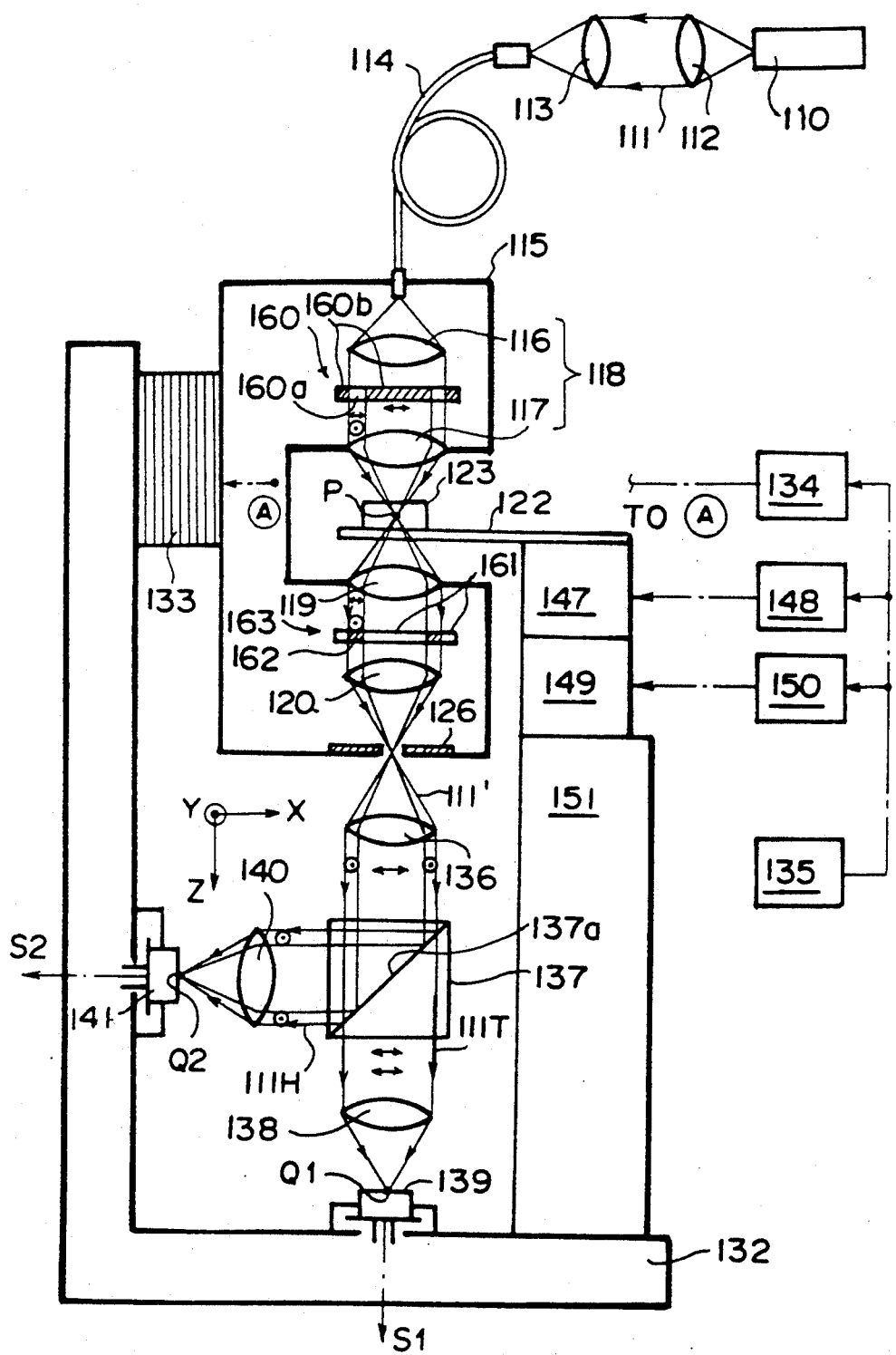
FIG. 9 is a partially cutaway front view showing a second embodiment of the scanning microscope in accordance with the present invention.
Figure 10:
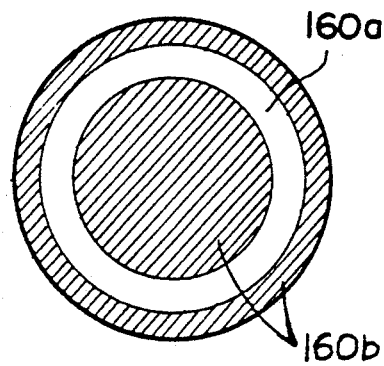
FIG. 10 is a plan view showing a polarizing phase plate employed in the second embodiment of the scanning microscope in accordance with the present invention.
Figure 11:
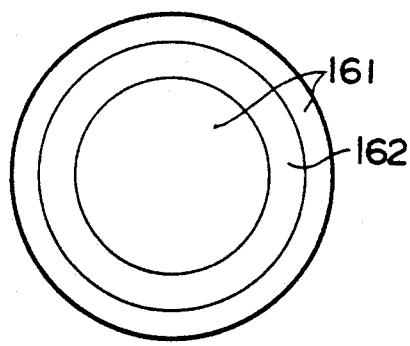
FIG. 11 is a plan view showing a compound analyzing plate employed in the second embodiment of the scanning microscope in accordance with the present invention.

A second embodiment of the scanning microscope in accordance with the present invention will be described hereinbelow with reference to FIGS. 9, 10, and 11. In FIGS. 9, similar elements are numbered with the same reference numerals with respect to FIG. 6. (This also applies to the remaining figures.)

With reference to FIG. 9, this embodiment differs from the first embodiment shown in FIG. 6 in that a polarizing phase plate 160 is employed in lieu of the compound polarizing plate 103, and a compound analyzing plate 163 is employed in lieu of the disk 104. As illustrated in FIG. 10, the polarizing phase plate 160 is composed of a ring-like phase plate (a ring-like quarter-wave plate) 160a and a polarizer 160b. The polarizer 160b is constituted of two parts, one of which is located on the side inward from the phase plate 160a and the other of which is located on the side outward from the phase plate 160a. The polarizer 160b transmits only the light component, which has been polarized linearly in the first direction. A thin layer for appropriately absorbing the laser beam 111 is overlaid on the surface part of the polarizer 160b. As illustrated in FIG. 11, the compound analyzing plate 163 is composed of a first analyzer 161 and a second analyzer 162, which are combined with each other. The second analyzer 162 has a ring-like shape. The first analyzer 161 is constituted of two parts, one of which is located on the side inward from the second analyzer 162 and the other of which is located on the side outward from the second analyzer 162. The first analyzer 161 transmits only the light component, which has been polarized linearly in the first direction. The second analyzer 162 transmits only the light component, which has been polarized linearly in the second direction.

The compound analyzing plate 163 is located such that the laser beam (the undiffracted light component) 111', which has passed through the phase plate 160a and which has then passed through the sample 123, impinges exactly upon the second polarizer 162. Specifically, the polarizing phase plate 160 is located in the front focal plane of the objective lens 117, and the compound analyzing plate 163 is located in conjugate relation with the polarizing phase plate 160.

In this embodiment, part of the laser beam 111, which has passed through the phase plate 160a of the polarizing phase plate 160 and which has thereby been imparted with a phase lag of $\lambda/4$, takes on the form of an unpolarized, annular band-like laser beam and impinges upon the sample 123. The other part of the laser beam 111 passes through the polarizer 160b of the polarizing phase plate 160. The other part of the laser beam 111 is polarized linearly in the first direction and impinges upon the sample 123. Therefore, the undiffracted light component 111', which has been polarized linearly in the first direction, impinges upon the first analyzer 161, said light component having passed through the polarizer 160b and having not been diffracted by the sample. This light component has not passed through the phase plate 160a and therefore has not been imparted with a phase lag. Light, which has been imparted with a phase lag by the phase plate 160a and which has been diffracted by the sample 123, also impinges upon the first analyzer 161. (Such light includes the light component, which has been polarized linearly in the first direction, and the light component, which has been polarized linearly in the second direction.) As a result, the undiffracted light component 111' imparted with no phase lag and the diffracted light component imparted with the phase lag, which light components have been polarized linearly in the first direction, are radiated out of the first analyzer 161. Therefore, with this embodiment, the point image Q1, which is detected by the first photodetector 139, results from the interference of the undiffracted light component 111', which has not been imparted with the phase lag, and the diffracted light component, which has been imparted with the phase lag. Accordingly, when an image is reproduced from the signal S1 generated by the first photodetector 139, a phase contrast image of the sample 123 can be obtained.

Also, with this embodiment, the undiffracted light component 111' and the diffracted light component, which have passed through the phase plate 160a and have thereby been imparted with a phase lag, impinge upon the second analyzer 162. (Each of the undiffracted light component 111' and the diffracted light component includes the light component, which has been polarized linearly in the first direction, and the light component, which has been polarized linearly in the second direction.) The diffracted light component, which has passed through the polarizer 160b and which has been polarized linearly in the first direction, also impinges upon the second analyzer 162. As a result, the undiffracted light component 111' and the diffracted light component, which have been polarized linearly in the second direction and which have been imparted with a phase lag, are radiated out of the second analyzer 162. Therefore, the point image Q2, which is detected by the second photodetector 141, is formed by the undiffracted light component 111' and the diffracted light component, which have been imparted with the phase lag. Accordingly, when an image is reproduced from the signal S2 generated by the second photodetector 141, an ordinary image of the sample 123 can be obtained.

As in the first embodiment of the scanning microscope in accordance with the present invention, both the phase contrast image and the ordinary image of the sample 123 at exactly the same instant can be reproduced from the signals S1 and S2. Alternatively, either one of the phase contrast image and the ordinary image of the sample 123 can be reproduced selectively.

In this case, the phase of the diffracted light component lags by approximately λ/2 from the phase of the undiffracted light component 111'. Therefore, a negative phase contrast type of image is obtained.

A third embodiment of the scanning microscope in accordance with the present invention will be described hereinbelow with reference to FIGS. 12, 13, and 14.

Figure 12:
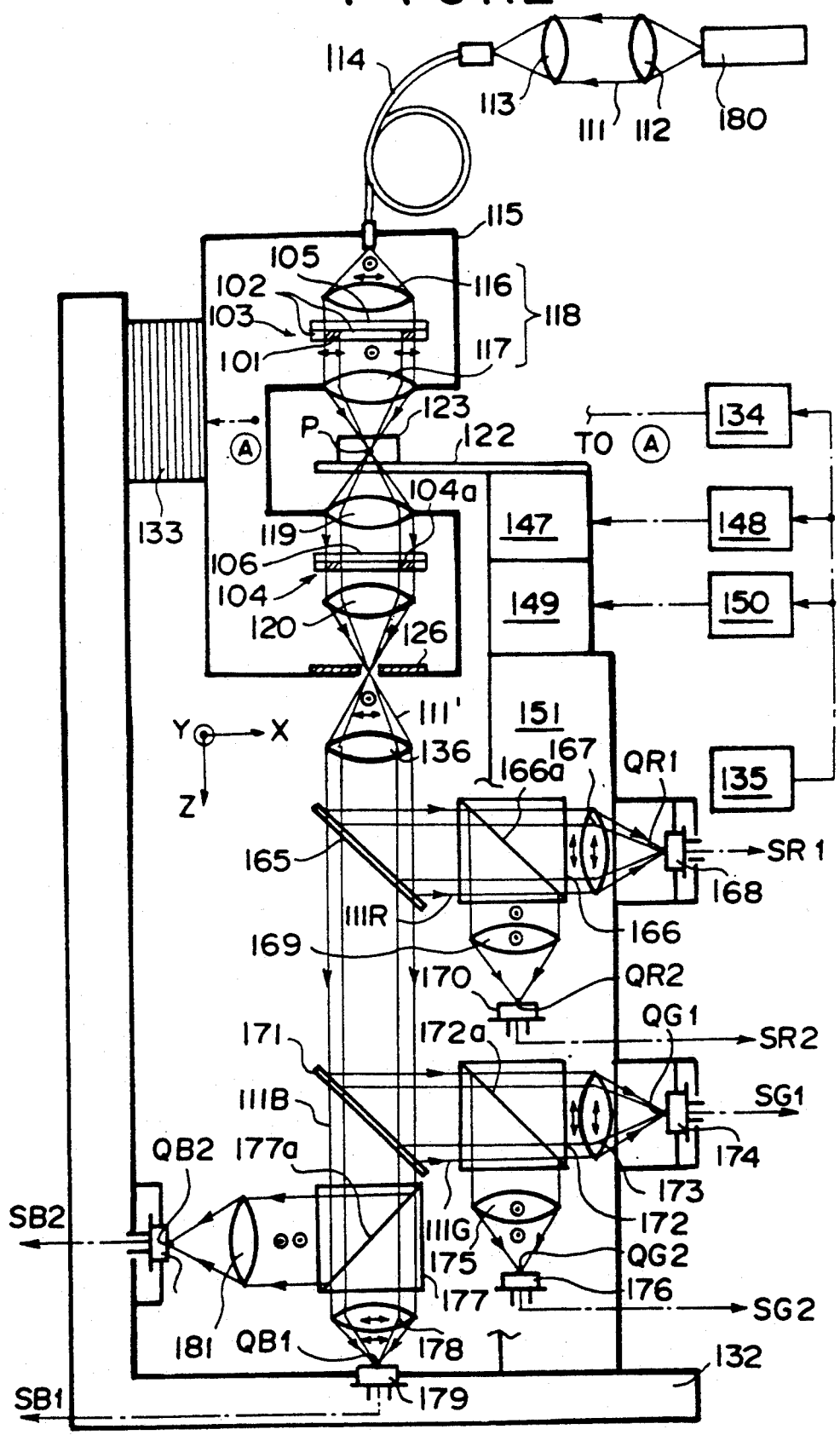
FIG. 12 is a partially cutaway front view showing a third embodiment of the scanning microscope in accordance with the present invention.

As illustrated in FIG. 12, this embodiment is provided with the compound polarizing plate 103 and the disk 104 provided with the analyzing phase plate 104a, which are the same as those employed in the first embodiment shown in FIG. 6. A compound filter plate 105 is located on the upper surface of the compound polarizing plate 103, and a compound filter plate 106 is located on the upper surface of the disk 104. Also, in this embodiment, an RGB laser 180, which produces a laser beam including red light, green light, and blue light as the laser beam 111, is employed as the light source.

As illustrated in FIG. 13, the compound filter plate 105 is composed of a plurality of fan-shaped filters, which are indicated by R, G, and B. The fan-shaped filters R transmits only the red light therethrough. The fan-shaped filters G transmits only the green light therethrough. The fan-shaped filters B transmits only the blue light therethrough. As illustrated in FIG. 14, the compound filter plate 106 is composed of fan-shaped filters R, fan-shaped filters G, and fan-shaped filters B. In each of the compound filter plates 105 and 106, the fan-shaped filters R are shifted by 180° from each other around the optical axis. This also applies to the fan-shaped filters G and the fan-shaped filters B. In FIG. 13, the position of the first polarizer 101 with respect to the position of the compound filter plate 105 is indicated by the chained lines. In FIG. 14, the position of the analyzing phase plate 104a with respect to the compound filter plate 106 is indicated by the chained lines.

In this embodiment, the conditions of polarization of the undiffracted light component and the diffracted light component, which impinge upon the collimator lens 136, are the same as those in the first embodiment shown in FIG. 6. Of the undiffracted light component and the diffracted light component, the red light 111R is reflected by a dichroic mirror 165 and impinges upon a polarization beam splitter 166 for red light. Of the red light 111R, the light component, which impinges as P-polarized light upon a film surface 166a of the polarization beam splitter 166, (i.e. the light component, which has been polarized linearly in the first direction) passes through the film surface 166a. Also, the light component, which impinges as S-polarized light upon the film surface 166a, (i.e. the light component, which has been polarized linearly in the second direction) is reflected by the film surface 166a.

The red light 111R, which has passed through the film surface 166a, is condensed by a condensing lens 167, and a point image QR1 is thereby formed. The point image QR1 is detected by a first photodetector 168 for red light. The first photodetector 168 generates a signal SR1, which represents the brightness of the point image QR1. The red light 111R, which has been reflected by the film surface 166a, is condensed by a condensing lens 169, and a point image QR2 is thereby formed. The point image QR2 is detected by a second photodetector 170 for red light. The second photodetector 170 generates a signal SR2, which represents the brightness of the point image QR2.

For the same reasons as those described above with reference to the first embodiment shown in FIG. 6, the red light 111R, which has passed through the film surface 166a of the polarization beam splitter 166, includes the undiffracted light component, which has passed through the analyzing phase plate 104a and has thereby been imparted with a phase lag, and the diffracted light component, which has been diffracted by the sample 123 and therefore has not passed through the analyzing phase plate 104a. (The diffracted light component is not imparted with a phase lag.) Therefore, the point image QR1, which is detected by the first photodetector 168, results from the interference of the undiffracted light component, which has been imparted with the phase lag, and the diffracted light component, which has not been imparted with the phase lag. Also, all of the light component, which has passed through the second polarizer 102 and which has then passed through the sample 123, (i.e. the light component, which has been polarized linearly in the second direction) is reflected by the film surface 166a of the polarization beam splitter 166. Also, the diffracted light component, which has been polarized linearly in the second direction, is reflected by the film surface 166a. Therefore, the point image QR2, which is detected by the second photodetector 170, is formed by the undiffracted light component and the diffracted light component, which have not been imparted with the phase lag. Accordingly, the enlarged image of the sample 123, which is represented by the signal SR1 generated by the first photodetector 168, is obtained as a phase contrast image. The enlarged image of the sample 123, which is represented by the signal SR2 generated by the second photodetector 170, is obtained as an ordinary image.

The undiffracted light component and the diffracted light component, which have passed through the dichroic mirror 165, impinge upon a dichroic mirror 171. Of the undiffracted light component and the diffracted light component, which have passed through the dichroic mirror 165, the green light 111G is reflected by the dichroic mirror 171 and thereafter impinges upon a polarization beam splitter 172 for green light. Of the green light 111G, the light component, which impinges as P-polarized light upon a film surface 172a of the polarization beam splitter 172, (i.e. the light component, which has been polarized linearly in the first direction) passes through the film surface 172a. Also, the light component, which impinges as S-polarized light upon the film surface 172a, (i.e. the light component, which has been polarized linearly in the second direction) is reflected by the film surface 172a.

The green light 111G, which has passed through the film surface 172a, is condensed by a condensing lens 173, and a point image QG1 is thereby formed. The point image QG1 is detected by a first photodetector 174 for green light. The first photodetector 174 generates a signal SG1, which represents the brightness of the point image QG1. The green light 111G, which has been reflected by the film surface 172a, is condensed by a condensing lens 175, and a point image QG2 is thereby formed. The point image QG2 is detected by a second photodetector 176 for green light. The second photodetector 176 generates a signal SG2, which represents the brightness of the point image QG2.

As in the red light 111R, the point image QG1, which is detected by the first photodetector 174, results from the interference of the undiffracted light component, which has been imparted with the phase lag, and the diffracted light component, which has not been imparted with the phase lag. Also, the point image QG2, which is detected by the second photodetector 176, is formed by the undiffracted light component and the diffracted light component, which have not been imparted with the phase lag. Accordingly, the enlarged image of the sample 123, which is represented by the signal SG1 generated by the first photodetector 174, is obtained as a phase contrast image. The enlarged image of the sample 123, which is represented by the signal SG2 generated by the second photodetector 176, is obtained as an ordinary image.

The undiffracted light component and the diffracted light component, which have passed through the dichroic mirror 171, (i.e. the blue light 111B) impinge upon a polarization beam splitter 177 for blue light. Of the blue light 111B, the light component, which impinges as P-polarized light upon a film surface 177a of the polarization beam splitter 177, (i.e. the light component, which has been polarized linearly in the first direction) passes through the film surface 177a. Also, the light component, which impinges as S-polarized light upon the film surface 177a, (i.e. the light component, which has been polarized linearly in the second direction) is reflected by the film surface 177a.

The blue light 111B, which has passed through the film surface 177a, is condensed by a condensing lens 178, and a point image QB1 is thereby formed. The point image QB1 is detected by a first photodetector 179 for blue light. The first photodetector 179 generates a signal SB1, which represents the brightness of the point image QB1. The blue light 111B, which has been reflected by the film surface 177a, is condensed by a condensing lens 181, and a point image QB2 is thereby formed. The point image QB2 is detected by a second photodetector 182 for blue light. The second photodetector 182 generates a signal SB2, which represents the brightness of the point image QB2.

As in the red light 111R and the green light 111G, the point image QB1, which is detected by the first photodetector 179, results from the interference of the undiffracted light component, which has been imparted with the phase lag, and the diffracted light component, which has not been imparted with the phase lag. Also, the point image QB2, which is detected by the second photodetector 182, is formed by the undiffracted light component and the diffracted light component, which have not been imparted with the phase lag. Accordingly, the enlarged image of the sample 123, which is represented by the signal SB1 generated by the first photodetector 179, is obtained as a phase contrast image. The enlarged image of the sample 123, which is represented by the signal SB2 generated by the second photodetector 182, is obtained as an ordinary image.

Accordingly, when the signals SR1, SG1, and SB1 are fed into a color image reproducing apparatus, a color phase contrast image of the sample 123 can be reproduced. When the signals SR2, SG2, and SB2 are fed into a color image reproducing apparatus, a color ordinary image can be obtained.

In cases where an achromatic process is carried out on the first polarizer 101 and the second polarizer 102 of the compound polarizing plate 103, the compound filter plate 105 and the compound filter plate 106 can be omitted. Also, the second embodiment of the scanning microscope, which is shown in FIG. 9, may be modified such that color images can be formed.

A fourth embodiment of the scanning microscope in accordance with the present invention will be described hereinbelow with reference to FIGS. 15 and 16.

Figure 15:
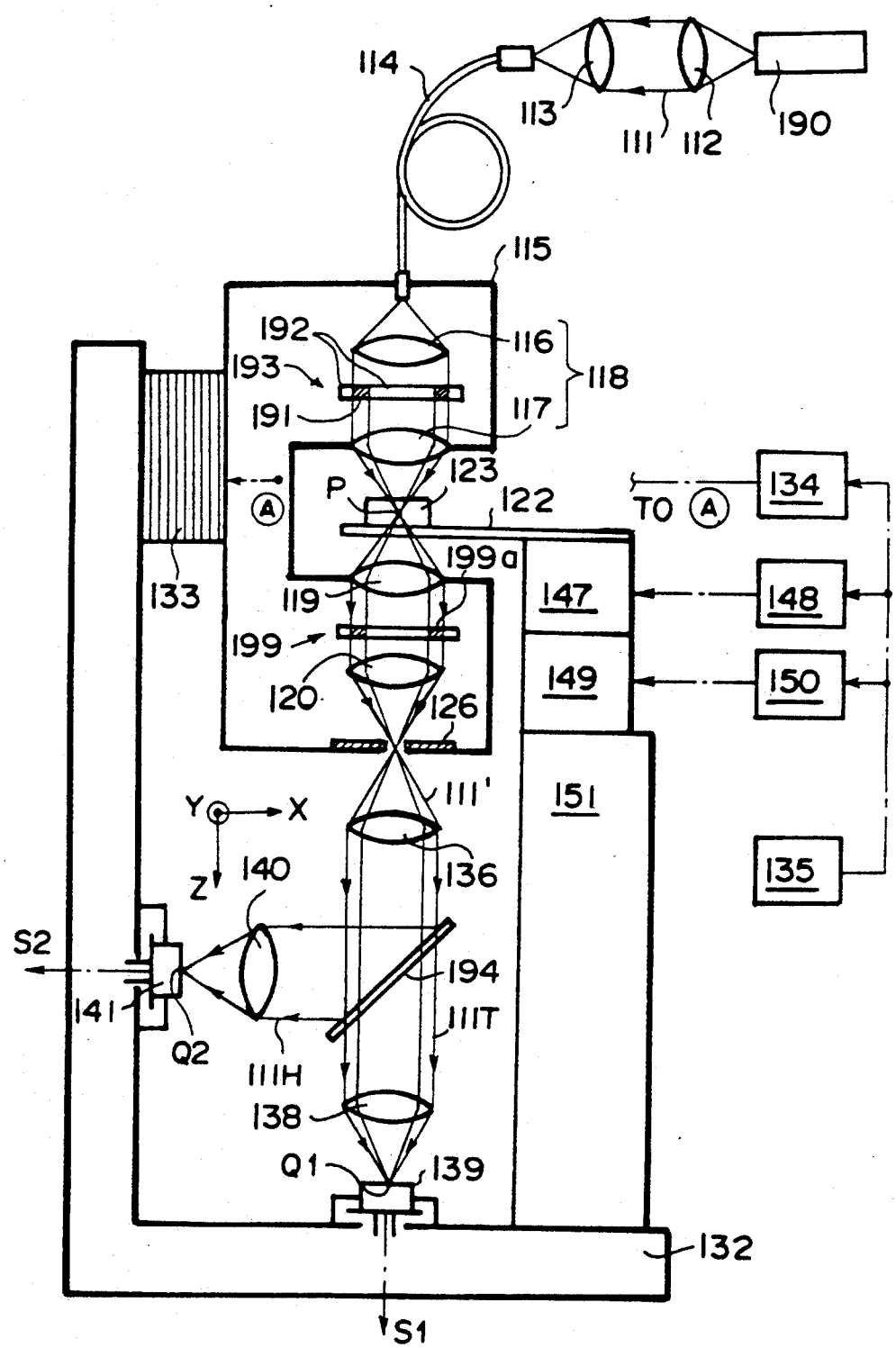
FIG. 15 is a partially cutaway front view showing a fourth embodiment of the scanning microscope in accordance with the present invention.
Figure 16:
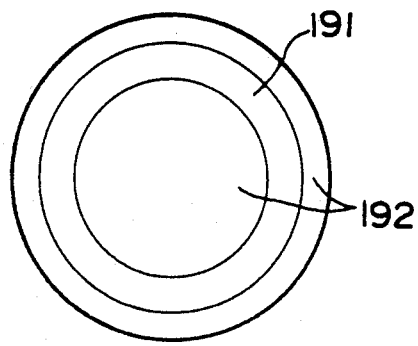
FIG. 16 is a plan view showing a compound filter plate employed in the fourth embodiment of the scanning microscope in accordance with the present invention.

As illustrated in FIG. 15, a laser beam source 190 is employed as the light source. The laser beam source 190 produces a laser beam 111 including a light component, which has a first wavelength $\lambda1$, and a light component, which has a second wavelength $\lambda2$. The laser beam source 190 may be constituted of two lasers, which produce laser beams having different wavelengths, and a means for combining the two laser beams. Alternatively, a light beam source may be employed which produces a light beam, such as a white light beam, including the light component, which has the first wavelength $\lambda1$, and the light component, which has the second wavelength $\lambda2$.

A compound filter plate 193 is located between the collimator lens 116 and the objective lens 117 of the light projecting optical means 118. As illustrated in FIG. 16, the compound filter plate 193 is composed of a ring-like first filter 191 and a second filter 192. The second filter 192 is constituted of two parts, one of which is located on the side inward from the first filter 191 and the other of which is located on the side outward from the first filter 191. The first filter 191 transmits only the light component, which has the first wavelength $\lambda1$, therethrough. The second filter 192 transmits only the light component, which has the second wavelength $\lambda2$, therethrough.

A disk 199 provided with a ring-like wavelength selective phase plate 199a is located between the objective lens 119 and the condensing lens 120, which constitute part of a light receiving optical means. The wavelength selective phase plate 199a is composed of a ring-like phase plate (a ring-like quarter-wave plate) and a ring-like filter, which are adhered to each other. The ring-like filter of the wavelength selective phase plate 199a transmits only the light component, which has the first wavelength $\lambda1$. As will be described later, the wavelength selective phase plate 199a serves as a filter and a phase plate. The part of the disk 199 other than the wavelength selective phase plate 199a is constituted of a transparent material, which does not serve as a filter or as a phase plate. The compound filter plate 193 is located in the front focal plane of the objective lens 117. The disk 199 is located in conjugate relation with the compound filter plate 193.

The laser beam 111 is collimated by the collimator lens 116, and the collimated laser beam 111 impinges upon the compound filter plate 193. Of the laser beam 111, only the light component, which has the first wavelength $\lambda1$, passes through the first filter 191. Also, only the light component, which has the second wavelength $\lambda2$, passes through the second filter 192. The first filter 191 has the shape described above. Therefore, the part of the laser beam 111 (i.e. the light component having the first wavelength $\lambda1$), which has passed through the first filter 191, takes on the form of an annular band-like laser beam. The laser beam 111, which has passed through the compound filter plate 193, is condensed by the objective lens 117. In this manner, a small light spot P is formed on the sample 123 (i.e. on the surface or in the inside of the sample 123).

The laser beam (the undiffracted light component) 111', which has passed through the sample 123, is collimated by the objective lens 119. The collimated laser beam 111' passes through the disk 199, and is then converged by the condensing lens 120. At the position at which the collimated laser beam 111' converges, the pinhole plate 126 is secured to the movable member 115. The laser beam 111' passes through the pinhole of the pinhole plate 126. Thereafter, the laser beam 111' impinges upon the collimator lens 136, which is secured to the frame 132. The laser beam 111', which has been collimated by the collimator lens 136, impinges upon a dichroic mirror 194. The dichroic mirror 194 transmits the light component, which has the first wavelength $\lambda 1$, and reflects the light component, which has the second wavelength $\lambda 2$.

The size of the wavelength selective phase plate 199a of the disk 199 is adjusted such that all of the light component, which has passed through the first filter 191 and which has then passed through the sample 123, (i.e. the undiffracted light component, which has the first wavelength $\lambda 1$) can impinge upon the wavelength selective phase plate 199a. Therefore, on the side downstream from the wavelength selective phase plate 199a, i.e. on the side opposite to the sample 123 with respect to the wavelength selective phase plate 199a, the light component, which has the first wavelength $\lambda 1$, includes the undiffracted light component, which has passed through the wavelength selective phase plate 199a and has thereby been imparted with a phase lag, and the diffracted light component, which has been diffracted by the sample 123 and therefore has not passed through the wavelength selective phase plate 199a. (The diffracted light component is not imparted with a phase lag.) Specifically, the light component 111T, which has passed through the dichroic mirror 194, comprises the undiffracted light component and the diffracted light component, which has the first wavelength $\lambda 1$. Therefore, the point image Q1, which is detected by the first photodetector 139, results from the interference of the undiffracted light component, which has been imparted with the phase lag, and the diffracted light component, which has not been imparted with the phase lag.

Also, on the side downstream from the wavelength selective phase plate 199a, the light component, which has the second wavelength $\lambda 2$, has not passed through the wavelength selective phase plate 199a and therefore has not been imparted with a phase lag. This light component includes the undiffracted light component and the diffracted light component, which has been diffracted by the sample 123. All of this light component is reflected by the dichroic mirror 194. Therefore, the point image Q2, which is detected by the second photodetector 141, is formed by the undiffracted light component and the diffracted light component, which have not been imparted with the phase lag.

Therefore, the enlarged image of the sample 123, which is represented by the signal S1 generated by the first photodetector 139, is obtained as a phase contrast image. The enlarged image of the sample 123, which is represented by the signal S2 generated by the second photodetector 141, is obtained as an ordinary image.

A fifth embodiment of the scanning microscope in accordance with the present invention will be described hereinbelow with reference to FIGS. 17 and 18.

Figure 17:
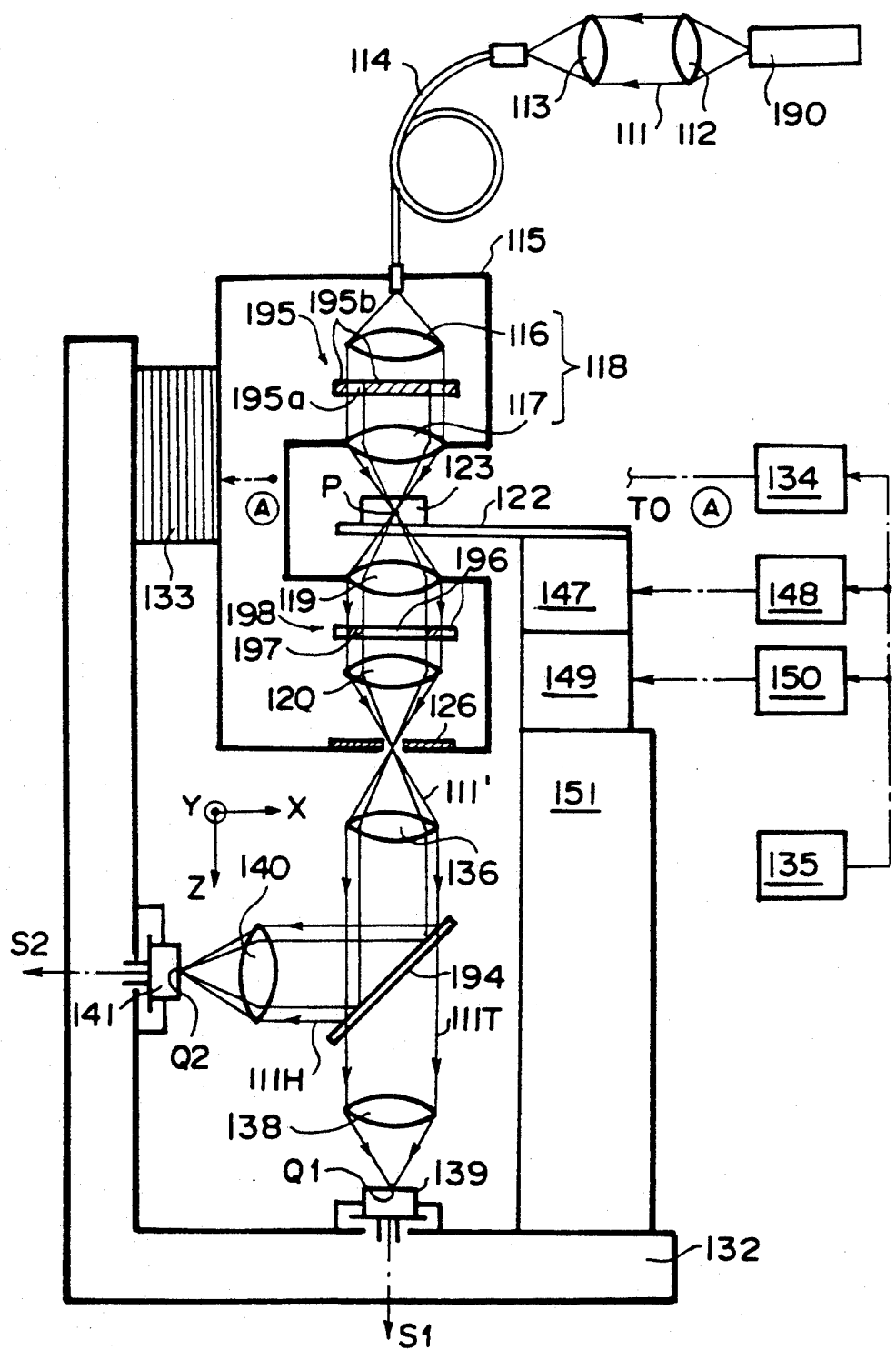
FIG. 17 is a partially cutaway front view showing a fifth embodiment of the scanning microscope in accordance with the present invention.

The fifth embodiment shown in FIG. 17 differs from the fourth embodiment shown in FIG. 15 in that a filter phase plate 195 is employed in lieu of the compound filter plate 193, and a compound filter plate 198 is employed in lieu of the disk 199. The filter phase plate 195 is composed of a ring-like phase plate (a ring-like quarter-wave plate) 195a and a light projecting side filter 195b. The light projecting side filter 195b is constituted of two parts, one of which is located on the side inward from the phase plate 195a and the other of which is located on the side outward from the phase plate 195a. The light projecting side filter 195b transmits only the light component, which has the first wavelength $\lambda 1$, therethrough. A thin layer for appropriately absorbing the laser beam 111 is overlaid on the surface part of the light projecting side filter 195b.

Figure 18:
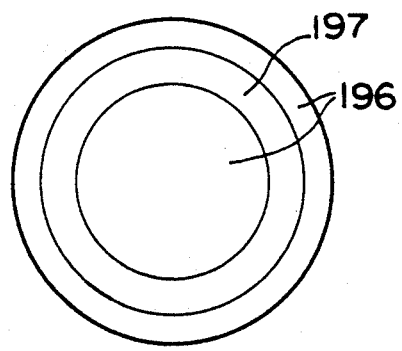
FIG. 18 is a plan view showing a compound filter plate employed in the fifth embodiment of the scanning microscope in accordance with the present invention.

As illustrated in FIG. 18, the compound filter plate 198 is composed of a first light receiving side filter 196 and a second light receiving side filter 197, which are combined with each other. The second light receiving side filter 197 has a ring-like shape. The first light receiving side filter 196 is constituted of two parts, one of which is located on the side inward from the second light receiving side filter 197 and the other of which is located on the side outward from the second light receiving side filter 197. The first light receiving side filter 196 transmits only the light component, which the first wavelength $\lambda 1$, therethrough. The second light receiving side filter 197 transmits only the light component, which has the second wavelength $\lambda 2$, therethrough.

The compound filter plate 198 is located such that the laser beam (the undiffracted light component) 111', which has passed through the phase plate 195a and which has then passed through the sample 123, impinges exactly upon the second light receiving side filter 197. Specifically, the filter phase plate 195 is located in the front focal plane of the objective lens 117. The compound filter plate 198 is located in conjugate relation with the filter phase plate 195.

In this embodiment, part of the laser beam 111, which has passed through the phase plate 195a of the filter phase plate 195 and which has thereby been imparted with a phase lag of $\lambda/4$, takes on the form of an annular band-like laser beam and impinges upon the sample 123. The other part of the laser beam 111 passes through the filter 195b of the filter phase plate 195, and only the light component, which has the first wavelength $\lambda 1$, impinges upon the sample 123. Therefore, the undiffracted light component 111', which has the first wavelength $\lambda 1$, impinges upon the first light receiving side filter 196, said light component having passed through the filter 195b and having not been diffracted by the sample. This light component has not passed through the phase plate 195a and therefore has not been imparted with a phase lag. Light, which has been imparted with a phase lag by the phase plate 195a and which has been diffracted by the sample 123, also impinges upon the first light receiving side filter 196. (Such light includes the light component, which has the first wavelength $\lambda 1$, and the light component, which has the second wavelength $\lambda 2$.) As a result, the undiffracted light component 111' imparted with no phase lag and the diffracted light component imparted with the phase lag, which light components have the first wavelength $\lambda 1$, are radiated out of the first light receiving side filter 196. Therefore, with this embodiment, the point image Q1, which is detected by the first photodetector 139, results from the interference of the undiffracted light component 111', which has not been imparted with the phase lag, and the diffracted light component, which has been imparted with the phase lag. Accordingly, when an image is reproduced from the signal S1 generated by the first photodetector 139, a phase contrast image of the sample 123 can be obtained.

Also, with this embodiment, the undiffracted light component 111' and the diffracted light component, which have passed through the phase plate 195a and have thereby been imparted with a phase lag, impinge upon the second light receiving side filter 197. (Each of the undiffracted light component 111' and the diffracted light component includes the light component, which has the first wavelength λ1, and the light component, which has the second wavelength λ2.) The diffracted light component, which has passed through the filter 195b and which has the first wavelength λ1, also impinges upon the second light receiving side filter 197. As a result, the undiffracted light component 111' and the diffracted light component, which have the second wavelength λ2 and which have been imparted with a phase lag, are radiated out of the second light receiving side filter 197. Therefore, the point image Q2, which is detected by the second photodetector 141, is formed by the undiffracted light component 111' and the diffracted light component, which have been imparted with the phase lag. Accordingly, when an image is reproduced from the signal S2 generated by the second photodetector 141, an ordinary image of the sample 123 can be obtained.

The aforesaid embodiments of the scanning microscope in accordance with the present invention are applied to confocal scanning microscopes. The scanning microscope in accordance with the present invention is also applicable to scanning microscopes of types other than the confocal type.

What is claimed is:

1. A scanning microscope comprising:
    i) a sample supporting member on which a sample is supported,
    ii) a light source for producing a light beam including a light component, which has been polarized linearly in a first direction, and a light component, which has been polarized linearly in a second direction that intersects perpendicularly to said first direction,
    iii) a first polarizer which has a predetermined shape, said first polarizer transmitting only said light component, which has been polarized linearly in said first direction, therethrough,
    iv) a second polarizer for transmitting only said light component, which has been polarized linearly in said second direction, therethrough,
    v) a light projecting optical means for forming an image of the light beam composed of said light components, which have respectively passed through said first polarizer and said second polarizer, said image being formed as a small light spot on said sample,
    vi) a scanning means which causes said light spot to scan said sample two-dimensionally,
    vii) an analyzing phase plate which has a shape corresponding to the shape of said first polarizer, said analyzing phase plate transmitting only said light component, which has been polarized linearly in said first direction, therethrough, said light component having been radiated out of said sample, a phase lag being thereby imparted to said light component, which has been polarized linearly in said first direction,
    viii) a polarization beam splitter which is located on the side downstream from said analyzing phase plate, said polarization beam splitter separating said light component, which has been polarized linearly in said first direction, and said light component, which has been polarized linearly in said second direction, from each other,
    ix) a first light receiving optical means for condensing said light component, which has been polarized linearly in said first direction, said light component having been separated by said polarization beam splitter from said light component, which has been polarized linearly in said second direction, an image of the condensed light component being thereby formed as a point image,
    x) a second light receiving optical means for condensing said light component, which has been polarized linearly in said second direction, said light component having been separated by said polarization beam splitter from said light component, which has been polarized linearly in said first direction, an image of the condensed light component being thereby formed as a point image,
    xi) a first photodetector for detecting said point image, which has been formed by said first light receiving optical means, and
    xii) a second photodetector for detecting said point image, which has been formed by said second light receiving optical means.

2. A scanning microscope as defined in claim 1 wherein said first polarizer has a ring-like shape.

3. A scanning microscope as defined in claim 2 wherein said second polarizer is composed of two parts, one of which is located on the side inward from said ring-like first polarizer and the other of which is located on the side outward from said ring-like first polarizer.

4. A scanning microscope as defined in claim 1 wherein said first polarizer, said second polarizer, said light projecting optical means, and said analyzing phase plate are secured to a movable member.

5. A scanning microscope as defined in claim 4 wherein said scanning means comprises:
    a) a main scanning means which reciprocally moves said movable member such that said light spot scans said sample in main scanning directions, and
    b) a sub-scanning means which moves said sample supporting member with respect to said movable member in sub-scanning directions, which are approximately normal to said main scanning directions, and at a speed lower than the speed at which said light spot scans said sample in said main scanning directions, whereby said sample is scanned with said light spot in said sub-scanning directions.

6. A scanning microscope as defined in claim 5 wherein a means is provided which reciprocally moves said sample supporting member in directions, which are normal to said main scanning directions and said sub-scanning directions.

7. A scanning microscope as defined in claim 1 wherein said light source is a laser.

8. A scanning microscope comprising:
    i) a sample supporting member on which a sample is supported,
    ii) a light source for producing a light beam including a light component, which has been polarized linearly in a first direction, and a light component, which has been polarized linearly in a second direction that intersects perpendicularly to said first direction,
    iii) a phase plate which has a predetermined shape, said phase plate imparting a phase lag to part of said light beam, which part passes through said phase plate, iv) a polarizer for transmitting only said light component, which has been polarized linearly in said first direction, therethrough, said light component being included in part of said light beam, which part does not pass through said phase plate, v) a light projecting optical means for forming an image of the light beam composed of said part of said light beam, which part has passed through said phase plate, and said light component, which has been polarized linearly in said first direction, said light component having passed through said polarizer, said image being formed as a small light spot on said sample, vi) a scanning means which causes said light spot to scan said sample two-dimensionally, vii) a first analyzer for transmitting only said light component, which has been polarized linearly in said first direction, therethrough, said light component having been radiated out of said sample, viii) a second analyzer which has a shape corresponding to the shape of said phase plate, said second analyzer transmitting only said light component, which has been polarized linearly in said second direction, therethrough, said light component being included in said part of said light beam, which part has been imparted with said phase lag and has been radiated out of said sample, ix) a polarization beam splitter for separating said light component, which has been polarized linearly in said first direction, said light component having passed through said first analyzer, and said light component, which has been polarized linearly in said second direction, said light component having passed through said second analyzer, from each other, x) a first light receiving optical means for condensing said light component, which has been polarized linearly in said first direction, said light component having been separated by said polarization beam splitter from said light component, which has been polarized linearly in said second direction, an image of the condensed light component being thereby formed as a point image, xi) a second light receiving optical means for condensing said light component, which has been polarized linearly in said second direction, said light component having been separated by said polarization beam splitter from said light component, which has been polarized linearly in said first direction, an image of the condensed light component being thereby formed as a point image, xii) a first photodetector for detecting said point image, which has been formed by said first light receiving optical means, and xiii) a second photodetector for detecting said point image, which has been formed by said second light receiving optical means.

9. A scanning microscope as defined in claim 8 wherein said phase plate has a ring-like shape.

10. A scanning microscope as defined in claim 9 wherein said polarizer is composed of two parts, one of which is located on the side inward from said ring-like phase plate and the other of which is located on the side outward from said ring-like phase plate.

11. A scanning microscope as defined in claim 8 wherein said phase plate, said polarizer, said light projecting optical means, said first analyzer, and said second analyzer are secured to a movable member.

12. A scanning microscope as defined in claim 11 wherein said scanning means comprises:

a) a main scanning means which reciprocally moves said movable member such that said light spot scans said sample in main scanning directions, and b) a sub-scanning means which moves said sample supporting member with respect to said movable member in sub-scanning directions, which are approximately normal to said main scanning directions, and at a speed lower than the speed at which said light spot scans said sample in said main scanning directions, whereby said sample is scanned with said light spot in said sub-scanning directions.

13. A scanning microscope as defined in claim 12 wherein a means is provided which reciprocally moves said sample supporting member in directions, which are normal to said main scanning directions and said sub-scanning directions.

14. A scanning microscope as defined in claim 8 wherein said light source is a laser.

15. A scanning microscope comprising:

i) a sample supporting member on which a sample is supported, ii) a light source for producing a light beam including a light component, which has a first wavelength, and a light component, which has a second wavelength different from said first wavelength, iii) a first filter which has a predetermined shape, said first filter transmitting only said light component, which has said first wavelength, therethrough, iv) a second filter for transmitting only said light component, which has said second wavelength, therethrough, v) a light projecting optical means for forming an image of the light beam composed of said light components, which have respectively passed through said first filter and said second filter, said image being formed as a small light spot on said sample, vi) a scanning means which causes said light spot to scan said sample two-dimensionally, vii) a wavelength selective phase plate which has a shape corresponding to the shape of said first filter, said wavelength selective phase plate transmitting only said light component, which has said first wavelength, therethrough, said light component having been radiated out of said sample, a phase lag being thereby imparted to said light component, which has said first wavelength, viii) a light splitting means which is located on the side downstream from said wavelength selective phase plate, said light splitting means separating said light component, which has said first wavelength, and said light component, which has said first wavelength, from each other, ix) a first light receiving optical means for condensing said light component, which has said first wavelength, said light component having been separated by said light splitting means from said light component, which has said second wavelength, an image of the condensed light component being thereby formed as a point image, x) a second light receiving optical means for condensing said light component, which has said second wavelength, said light component having been separated by said light splitting means from said light component, which has said first wavelength, an image of the condensed light component being thereby formed as a point image, xi) a first photodetector for detecting said point image, which has been formed by said first light receiving optical means, and xii) a second photodetector for detecting said point image, which has been formed by said second light receiving optical means.

16. A scanning microscope as defined in claim 15 wherein said first filter has a ring-like shape.

17. A scanning microscope as defined in claim 16 wherein said second filter is composed of two parts, one of which is located on the side inward from said ring-like first filter and the other of which is located on the side outward from said ring-like first filter.

18. A scanning microscope as defined in claim 15 wherein said first filter, said second filter, said light projecting optical means, and said wavelength selective phase plate are secured to a movable member.

19. A scanning microscope as defined in claim 18 wherein said scanning means comprises:
 a) a main scanning means which reciprocally moves said movable member such that said light spot scans said sample in main scanning directions, and
 b) a sub-scanning means which moves said sample supporting member with respect to said movable member in sub-scanning directions, which are approximately normal to said main scanning directions, and at a speed lower than the speed at which said light spot scans said sample in said main scanning directions, whereby said sample is scanned with said light spot in said sub-scanning directions.

20. A scanning microscope as defined in claim 19 wherein a means is provided which reciprocally moves said sample supporting member in directions, which are normal to said main scanning directions and said sub-scanning directions.

21. A scanning microscope as defined in claim 15 wherein said light source is a laser beam source.

22. A scanning microscope comprising:
 i) a sample supporting member on which a sample is supported,
 ii) a light source for producing a light beam including a light component, which has a first wavelength, and a light component, which has a second wavelength different from said first wavelength,
 iii) a phase plate which has a predetermined shape, said phase plate imparting a phase lag to part of said light beam, which part passes through said phase plate,
 iv) a light projecting side filter for transmitting only said light component, which has said first wavelength, therethrough, said light component being included in part of said light beam, which part does not pass through said phase plate,
 v) a light projecting optical means for forming an image of the light beam composed of said part of said light beam, which part has passed through said phase plate, and said light component, which has said first wavelength, said light component having passed through said light projecting side filter, said image being formed as a small light spot on said sample,
 vi) a scanning means which causes said light spot to scan said sample two-dimensionally,
 vii) a first light receiving side filter for transmitting only said light component, which has said first wavelength, therethrough, said light component having been radiated out of said sample,
 viii) a second light receiving side filter which has a shape corresponding to the shape of said phase plate, said second light receiving side filter transmitting only said light component, which has said second wavelength, therethrough, said light component being included in said part of said light beam, which part has been imparted with said phase lag and has been radiated out of said sample,
 ix) a light splitting means for separating said light component, which has said first wavelength, said light component having passed through said first light receiving side filter, and said light component, which has said second wavelength, said light component having passed through said second light receiving side filter, from each other,
 x) a first light receiving optical means for condensing said light component, which has said first wavelength, said light component having been separated by said light splitting means from said light component, which has said second wavelength, an image of the condensed light component being thereby formed as a point image,
 xi) a second light receiving optical means for condensing said light component, which has said second wavelength, said light component having been separated by said light splitting means from said light component, which has said first wavelength, an image of the condensed light component being thereby formed as a point image,
 xii) a first photodetector for detecting said point image, which has been formed by said first light receiving optical means, and
 xiii) a second photodetector for detecting said point image, which has been formed by said second light receiving optical means.

23. A scanning microscope as defined in claim 22 wherein said phase plate has a ring-like shape.

24. A scanning microscope as defined in claim 23 wherein said light projecting side filter is composed of two parts, one of which is located on the side inward from said ring-like phase plate and the other of which is located on the side outward from said ring-like phase plate.

25. A scanning microscope as defined in claim 22 wherein said phase plate, said light projecting side filter, said light projecting optical means, said first light receiving side filter, and said second light receiving side filter are secured to a movable member.

26. A scanning microscope as defined in claim 25 wherein said scanning means comprises:
 a) a main scanning means which reciprocally moves said movable member such that said light spot scans said sample in main scanning directions, and
 b) a sub-scanning means which moves said sample supporting member with respect to said movable member in sub-scanning directions, which are approximately normal to said main scanning directions, and at a speed lower than the speed at which said light spot scans said sample in said main scanning directions, whereby said sample is scanned with said light spot in said sub-scanning directions.

27. A scanning microscope as defined in claim 26 wherein a means is provided which reciprocally moves said sample supporting member in directions, which are normal to said main scanning directions and said sub-scanning directions.

28. A scanning microscope as defined in claim 22 wherein said light source is a laser beam source.

* * * * *